(12) United States Patent
Jain et al.

(10) Patent No.: US 11,197,230 B2
(45) Date of Patent: Dec. 7, 2021

(54) HANDLING OF USER EQUIPMENT COVERAGE ENHANCEMENT MODE B RADIO CAPABILITY MISMATCH DUE TO CHANGE IN USER EQUIPMENT USAGE SETTING

(71) Applicant: Apple Inc., Cupertino, CA (US)

(72) Inventors: Puneet Jain, Hillsboro, OR (US); Robert Zaus, Munich (DE); Ahmed Soliman, Nuremberg BY (DE); Marta Martinez Tarradell, Hillsboro, OR (US); Stefania Sesia, Roquefors-les-Pins (FR)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 16/462,339

(22) PCT Filed: Jan. 30, 2018

(86) PCT No.: PCT/US2018/015869
§ 371 (c)(1),
(2) Date: Sep. 13, 2019

(87) PCT Pub. No.: WO2018/174995
PCT Pub. Date: Sep. 27, 2018

(65) Prior Publication Data
US 2021/0029618 A1    Jan. 28, 2021

Related U.S. Application Data

(60) Provisional application No. 62/473,917, filed on Mar. 20, 2017, provisional application No. 62/505,520, filed on May 12, 2017.

(51) Int. Cl.
*H04W 48/16* (2009.01)
*H04W 88/06* (2009.01)
(Continued)

(52) U.S. Cl.
CPC ............. *H04W 48/04* (2013.01); *H04W 8/02* (2013.01); *H04W 8/18* (2013.01); *H04W 8/22* (2013.01); *H04W 48/16* (2013.01); *H04W 88/06* (2013.01)

(58) Field of Classification Search
CPC ..... H04W 48/04; H04W 88/06; H04W 48/16; H04W 8/18; H04W 8/02; H04W 8/22
See application file for complete search history.

(56) References Cited

U.S. PATENT DOCUMENTS

| 2016/0119822 A1* | 4/2016 | Chimmapudi | ........ H04W 76/16 370/217 |
| 2019/0110241 A1* | 4/2019 | Jain | ....................... H04W 24/02 |

FOREIGN PATENT DOCUMENTS

CN    102783217    11/2012

OTHER PUBLICATIONS

PCT/US2018/015869/ internation searching authority p. 25, Intel IP corporation, 2018.*

(Continued)

*Primary Examiner* — Joseph E Dean, Jr.
(74) *Attorney, Agent, or Firm* — Fish & Richardson P.C.

(57) ABSTRACT

Methods, systems, and storage media are provided for user equipment (UE) that supports enhanced coverage and may operate with a voice centric usage setting or a data centric usage setting. When the UE's usage setting is set to voice centric, the UE may not operate in coverage enhancement (CE) mode B. When the UE's usage setting is set to data centric, then the UE may operate in CE mode B. The UE may indicate the UE's usage setting in an Attach or Tracking Area Update (TAU) request message, and a mobility management entity (MME) may indicate to an evolved NodeB (Continued)

that CE mode B is restricted or not restricted based on the usage setting. Other embodiments may be described and/or claimed.

20 Claims, 12 Drawing Sheets

(51) Int. Cl.
*H04W 48/04* (2009.01)
*H04W 8/02* (2009.01)
*H04W 8/18* (2009.01)
*H04W 8/22* (2009.01)

(56) References Cited

OTHER PUBLICATIONS

3GPP, "Technical Specification Group Services and System Aspects; Architectural requirements (Release 14)," 3GPP TS 23.221 V14.1.0 (Dec. 2016), LTE Advanced, 52 pages.
3GPP, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0 (Dec. 2016), Lte Advanced Pro, 317 pages.
3GPP, "Technical Specification Group Services and System Aspects; General Packet Radio Service (GPRS) enhancements for Evolved Universal Terrestrial Radio Access Network (E-UTRAN) access (Release 14)," 3GPP TS 23.401 V14.3.0 (Mar. 2017), Lte Advanced Pro, 386 pages.
3GPP, "Technical Specification Group Radio Access Network; Evolved Universal Terrestrial Radio Access Network (E-UTRAN); S1 Application Protocol (S1AP) (Release 14)," 3GPP TS 36.413 V14.1.0 (Jan. 2017), Lte Advanced Pro, 333 pages.
3GPP, "Technical Specification Group Core Network and Terminals; Non-Access-Stratum (NAS) protocol for Evolved Packet System (EPS); Stage 3 (Release 14)," 3GPP TS 24.301 V14.3.0 (Mar. 2017), Lte Advanced Pro, 476 pages.
3GPP, "Technical Specification Group Radio Access Network; Evolved Universal Terrestrial Radio Access (E-UTRA); Radio Resource Control (RRC); Protocol specification (Release 14)," 3GPP TS 36.331 V14.1.0 (Dec. 2016), Lte Advanced Pro, 654 pages.
International Patent Office—International Search Report and Written Opinion dated Jun. 5, 2018, from International Application No. PCT/US2018/015869, 25 pages.
Telecom Italia et al., "Delivery of UE voice capabilities/settings in NAS signaling," 33GPP TSG-SA2 Meeting #75, S2-095994, Change Request, 23.401, CR 1294, Current version: 9.1.0, pages.
Intel, "Authorization of use of Coverage Enhancement," SA WG2 Meeting #118, S2-166936, Change Request 23.401, CR 3135, rev 4, Current version: 14.1.0, 54 pages.
Qualcomm Incorporated, "On voice support for CE mode A/B," SA WG2 Meeting #119, S2-170877, Agenda Item: 5.1, Feb. 13-17, 2017, Dubrovnik, Croatia, 3 pages.
Nokia, "CE mode A/B with dedicated bearer establishment," SA WG2 Meeting #119, S2-171168, Agenda Item: 5.1, Feb. 13-17, 2017, Dubrovnik, Croatia, 3 pages.
Nokia, "CE Mode A/B with dedicated bearer establishment—network based solution," SA WG2 Meeting #119, S2-171172, Change Request 23.401, CR 3198, rev 1, Current version: 14.2.0, Feb. 13-17, 2017, Dubrovnik, Croatia, 7 pages.
Nokia, "Restriction of CE Mode B with dedicated bearer requirements," SA WG2 Meeting #119, S2-171403, Change Request 23.401, CR 3209, rev 1, Current version: 14.2.0, 2 pages.
Intel, "Handling of CE Mode B support for "Voice Centric" UEs," SA WG2 Meeting #120, S2-171987, Agenda Item 5.1, Mar. 27-31, 2017, Busan, S. Korea, 4 pages.
Intel, "Data support for "voice centric" UE supporting CE mode B," SA WG2 Meeting #124, S2-178974, Change Request 23.401, CR 3348, rev 3, Current version: 15.1.0, Nov. 27, 2017-Dec. 1, 2017, Reno, Nevada, 16 pages.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)," 23.401 version (v) 15.2.0, Dec. 22, 2017, 404 pages.
PCT International Preliminary Report on Patentability in International Appln. No. PCT/US2018/015869, dated Oct. 3, 2019, 15 pages.
PCT Invitation to Pay Additional Fees in International Appln. No. PCT/US2018/015869, dated Apr. 16, 2018, 14 pages.

\* cited by examiner

HANDLING OF USER EQUIPMENT COVERAGE ENHANCEMENT MODE B RADIO CAPABILITY MISMATCH DUE TO CHANGE IN USER EQUIPMENT USAGE SETTING

RELATED APPLICATIONS

The present application claims priority under 35 U.S.C. § 119 to International Application No. PCT/US2018/015869 filed on Jan. 30, 2018, U.S. Provisional Application No. 62/473,917 filed Mar. 20, 2017 and U.S. Provisional Application No. 62/505,520 filed on May 12, 2017, the contents of each of which are hereby incorporated by reference in their entireties.

FIELD

Various embodiments of the present application generally relate to the field of wireless communications, and in particular, to user equipment operating using coverage enhancement.

BACKGROUND

A user equipment (UE) in enhanced coverage is a UE that requires the use of enhanced coverage functionality to access a cell. Two enhanced coverage modes are supported by current Third Generation Partnership Project (3GPP) standards, CE mode A and CE mode B (where "CE" refers to "coverage enhancement" or "coverage extension"). A UE that supports CE mode B may be configured to have a usage setting as "data centric" or "voice centric." A UE's usage setting of "voice centric" indicates that the UE should be able to use voice services at any time. An Evolved Universal Mobile Telecommunications System (UMTS) Terrestrial Radio Access (E-UTRA) radio bearer configured for use in CE mode B is not suitable for voice communication, for example, due to the transmission delay introduced by the specific protocol mechanisms for the support of enhanced coverage.

A UE may signal an indication that the UE supports CE mode B during each Radio Resource Control (RRC) connection establishment, as well as in UE Radio Capability information. According to current 3GPP standards, the UE radio capability can only be changed by performing a new attach procedure. When a UE has a usage setting of "data centric" or "voice centric" and attaches to the network, a mobility management entity (MME) stores the UE radio capability information that indicates whether the UE supports CE mode B. When the UE switches its usage setting from voice centric to data centric (or vice versa), the UE will initiate Tracking Area Update (TAU) procedure and send a TAU Request message to indicate that the UE's usage setting has been changed. During the RRC connection establishment for this TAU procedure or for a subsequent service request procedure, the UE will indicate its CE mode B setting in one of the RRC messages. Additionally, the MME will send an S1-application protocol (AP) Initial Context Setup message including the UE radio capability to the evolved NodeB (eNB), and the UE radio capability will indicate the previous CE mode B setting of the UE. The eNB may assume that the previous CE mode B setting obtained from the MME is correct even if the UE's usage setting has changed. Therefore, the signaling according to current Third Generation Partnership Project (3GPP) standards does not allow to inform the eNB that CE mode B is no longer to be used for the UE if the UE's usage setting is changed from "data centric" or "voice centric".

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
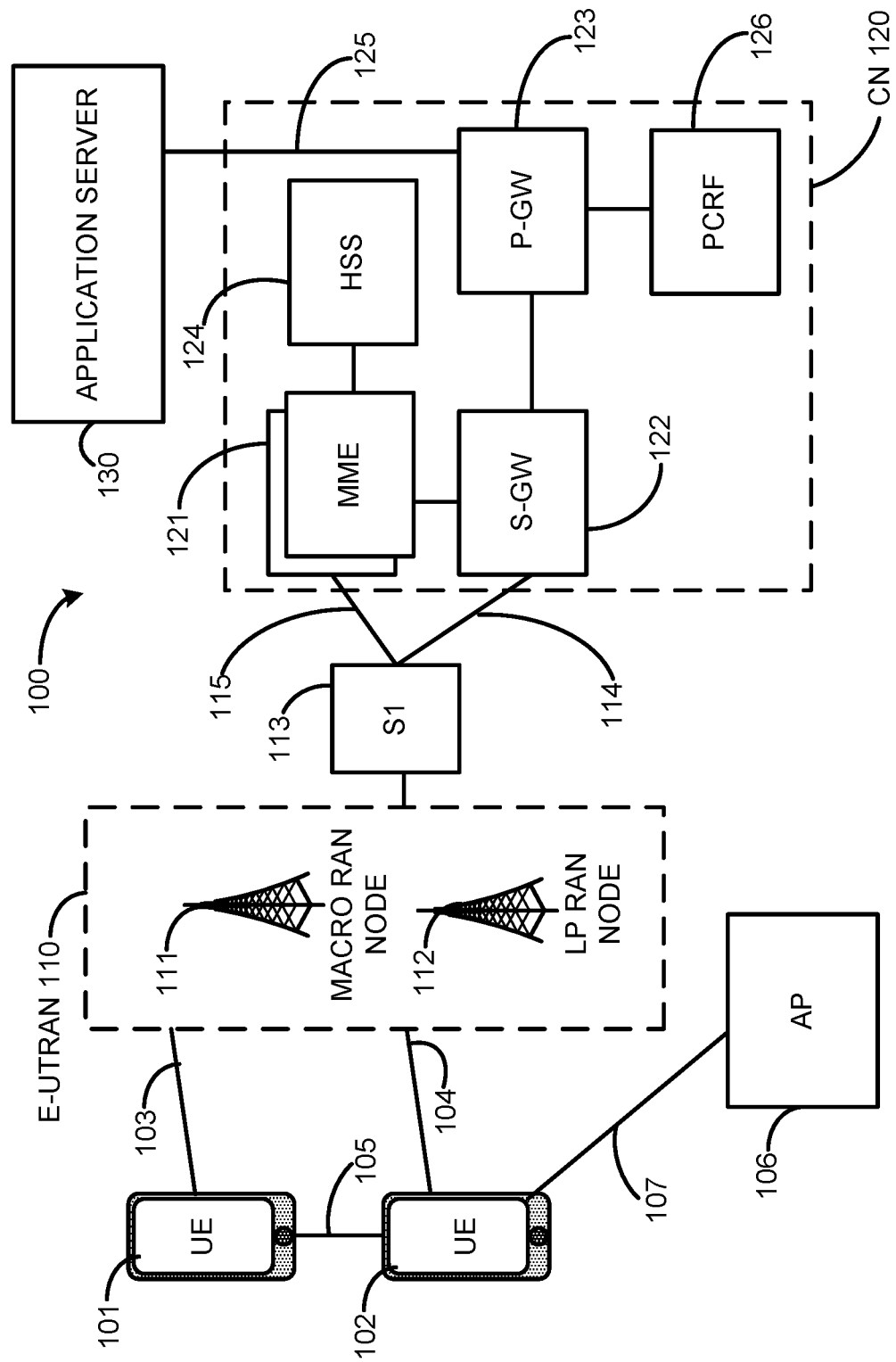
FIG. 1 illustrates an example system architecture of a network, in accordance with various embodiments.

Embodiments discussed herein relate to enhanced coverage for user equipment (UE) that may operate according to a voice centric usage setting or a data centric usage setting. When the UE's usage setting is set to voice centric, the UE may not operate in coverage enhancement (CE) mode B. When the UE's usage setting is set to data centric, then the UE may operate in CE mode B. The UE may indicate the UE's usage setting in an Attach or Tracking Area Update (TAU) request message, which may be sent to a mobility management entity (MME). If the UE supports CE mode B and the UE's usage setting is set to voice centric in the Attach/TAU request message, then the MME may indicate to an evolved NodeB (eNB) that CE mode B is restricted for the UE. If the UE supports CE mode B and the UE's usage setting is set to data centric in the Attach/TAU request message, then the MME may indicate to the eNB that CE mode B is not restricted for the UE. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like.

When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

FIG. 1 illustrates an architecture of a system 100 of a network, in accordance with various embodiments. The following description is provided for an example system 100 that operates in conjunction with the Long Term Evolution (LTE) standard as provided by 3rd Generation Partnership Project (3GPP) technical specifications (TS). However, the example embodiments are not limited in this regard and the described embodiments may apply to other networks that benefit from the principles described herein, such as Fifth Generation (5G) or New Radio (NR) systems, and the like.

As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (for example, handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 101 and 102 can comprise an IoT UE, which can comprise a network access layer designed for low-power IoT applications utilizing short-lived UE connections. An IoT UE can utilize technologies such as M2M or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (for example, keep-alive messages, status updates, etc.) to facilitate the connections of the IoT network.

The UEs 101 and 102 may be configured to connect, for example, communicatively couple, with a radio access network (RAN)—in this embodiment, an Evolved Universal Mobile Telecommunications System (UMTS) Terrestrial Radio Access Network (E-UTRAN) 110. The UEs 101 and 102 utilize connections (or channels) 103 and 104, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 and 102 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (for example, connection 107) via Internet Protocol Security (IPsec) protocol tunneling to authenticate and encrypt packets (for example, internet protocol (IP) packets) sent over the connection 107. IPsec tunneling may include encapsulating entirety of original IP packets and adding a new packet header thereby protecting the original header of the IP packets.

The Radio Access Network (RAN) 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), Transmission Reception Points (TRxPs or TRPs), and so forth, and can comprise ground stations (for example, terrestrial access points) or satellite stations providing coverage within a geographic area (for example, a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, for example, macro RAN node 111, and one or more RAN nodes for providing femtocells or picocells (for example, cells having smaller coverage areas, smaller user capacity, or higher bandwidth compared to macrocells), for example, low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (for example, for downlink communications) or a Single Carrier Frequency Division Multiple Access (SC-FDMA) communication technique (for example, for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (for example, assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (for example, aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of
EREGs in some situations.

The RAN 110 is shown to be communicatively coupled to a core network—in this embodiment, Core Network (CN) 120 (for example, an Evolved Packet Core (EPC)) via an S1 interface 113. In this embodiment the S1 interface 113 is split into two parts, the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the EPC network 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may perform various mobility management (MM) procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 101, 102, provide user identity confidentiality, and/or other like services to users/subscribers. Each UE 101, 102 and the MME 121 may include an MM or EMM sublayer, and an MM context may be established in the UE 101, 102 and the MME 121 when an attach procedure is successfully completed. The MM context may be a data structure or database object that stores MM-related information of the UE 101, 102.

The (E)MM sublayer may operate in one of two states, an EMM-REGISTERED state or an EMM-DEREGISTERED state. When the MM/EMM context has been established, the EMM sublayer may enter the EMM-REGISTERED state. In the EMM-REGISTERED state, the UE 101, 102 may initiate sending and receiving user data and signaling information, reply to paging, and perform tracking area update procedures. Additionally, the EMM sublayer of the UE 101, 102 may operate in an EMM-IDLE mode or an EMM-CONNECTED mode. EMM States and Modes can occur in any combination. For example, initially a UE 101, 102 may be in the EMM-DEREGISTERED state and the EMM-IDLE mode and then, by establishing an RRC connection, the UE 101, 102 may change to the EMM-CONNECTED mode in the EMM-DEREGISTERED state. Upon successful completion of the attach procedure, the UE 101, 102 may change to the EMM-REGISTERED state and the EMM-CONNECTED mode. When the UE 101, 102 is attached and the UE 101, 102 and network do not have any traffic/signaling to send, the network may release the radio connection and the UE 101, 102 may change to EMM-IDLE mode while in the EMM-REGISTERED state.

When the UE 101, 102 is in EMM-REGISTERED state and in EMM-IDLE mode (also referred to as an "EPS Connection Management (ECM)-IDLE state"), the UE 101, 102 location is known to the MME 121 with an accuracy of a list of tracking areas containing a certain number of tracking areas. The UE 101, 102 may be in EMM-IDLE mode when no NAS signaling connection between the UE 101, 102 and network (for example, MME 121) exists. When the UE 101, 102 is in EMM-CONNECTED mode (also referred to as "ECM-CONNECTED state"), the UE 101, 102 location is known to the MME 121 with an accuracy of a serving E-UTRAN node 111, 112. The UE 101, 102 may be in EMM-CONNECTED mode when a NAS signaling connection between UE and network is established.

The HSS 124 may comprise a database for network users, including subscription-related information to support the network entities' handling of communication sessions. The EPC network 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the EPC network 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and e2ernal networks such as a network including the application server 130 (alternatively referred to as application function (AF)) via an Internet Protocol (IP) interface 125. Generally, the application server 130 may be an element offering applications that use IP bearer resources with the core network (for example, UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (for example, Voice-over-Internet Protocol (VoIP) sessions, PTT sessions, group communication sessions, social networking services, etc.) for the UEs 101 and 102 via the EPC network 120.

The P-GW 123 may further be a node for policy enforcement and charging data collection. Policy and Charging Enforcement Function (PCRF) 126 is the policy and charging control element of the EPC network 120. In a non-roaming scenario, there may be a single PCRF in the Home Public Land Mobile Network (HPLMN) associated with an RE's Internet Protocol Connectivity Access Network (IP-CAN) session. In a roaming scenario with local breakout of traffic, there may be two PCRFs associated with an RE's IP-CAN session, a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

According to various embodiments, the UEs 101, 102 may operate in an enhanced coverage mode or use enhanced coverage functionality to access cell(s) provided by RAN nodes 111, 112. In some embodiments, the UEs 101, 102 that operate with enhanced coverage may be bandwidth reduced low complexity (BL) UEs 101, 102, which are UEs that can operate in any LTE (or NR) system bandwidth but with a limited channel bandwidth of, for example, 6 physical resource blocks (PRBs) (corresponding to a maximum channel bandwidth available in an LTE system of 1.4 MHz, for example) in downlink and uplink.

Currently, there are two enhanced coverage modes supported by 3GPP standards: coverage enhancement (CE) mode A and CE mode B. CE mode A may be used for relatively modest coverage enhancement and CE mode B may be used for extensive coverage enhancement. UEs 101, 102 operating in CE mode B may have a maximum PDSCH/PUSCH bandwidth in connected mode for unicast transmission depending on a UE category of the UEs 101, 102. For example, a category M1 BL UE operating in CE mode B may have a maximum of 6 PRB bandwidth for each of the PDSCH and PUSCH; a category M2 BL UE operating in CE mode B may have a maximum 24 PRB bandwidth for PDSCH and maximum 6 PRB bandwidth for PUSCH; and a non-BL UE operating in CE mode B may have a maximum 96 PRB bandwidth for PDSCH and maximum 6 PRB bandwidth for PUSCH.

The UEs 101, 102 may also be Circuit Switched Fallback (CSFB) and/or IP Multimedia Subsystem (IMS)/Circuitry Switched (CS)-voice capable UEs. CSFB allows UEs to fall back to using GERAN (Global System for Mobile Communications (GSM)/Enhanced Data Rates for GSM Evolution (EDGE) Radio Access Network), UTRAN (Universal Terrestrial Radio Access Network), or some other legacy system while in E-UTRAN in order to, inter alia, initiate or receive calls via the circuit switched (CS) domain. In such embodiments, the UEs 101, 102 may perform an access domain selection procedure for UE originating voice calls for deciding whether a call should be serviced in the CS domain or using IMS. The access domain selection may be based on, inter alia, a state of the UE 101, 102 in the CS domain (for example, attached, detached), a state of the UE 101, 102 in the IMS (for example, registered or unregistered), a domain used by an existing session/call for the same service, user preferences and/or operator policies, whether the UE 101, 102 supports IMS over PS session, and whether the UE 101, 102 is expected to behave in a "Voice centric" or "Data Centric" way.

The domain selection for originating voice calls may include setting the UEs, 101, 102 to behave as "Voice centric" or "Data Centric." When a UE 101, 102 is set to "voice centric," the UE 101, 102 will always try to ensure that voice service is possible. This means that a voice centric UE 101, 102 may reselect to a 2G/3G RAN node (for example, by disabling its E-UTRA capabilities) if voice service in E-UTRAN cannot be provided via CSFB or voice over IMS. When a UE 101, 102 is set to "data centric," the UEs 101, 102 do not disable the E-UTRAN capability if voice services cannot be obtained. This means that a data centric UE 101, 102 will not reselect to a different RAT even if voice service in E-UTRAN cannot be provided via CSFB or voice over IMS.

If the UE 101, 102 supports CSFB, or the UE 101, 102 is configured to support IMS voice, or both, the UE shall include a "Voice domain preference and UE's usage setting" information element (IE) in an Attach Request, Tracking Area Update (TAU) Request, and Routing Area Update (RAU) Request messages. The UE 101, 102 may use the "Voice domain preference and UE's usage setting" IE to signal to the network the UE's usage setting and voice domain preference for E-UTRAN. The UE's usage setting indicates whether the UE behaves in a voice centric or data centric way. The voice domain preference for E-UTRAN indicates whether the UE is configured as CS Voice only, CS Voice preferred and IMS packet switched (PS) Voice as secondary, IMS PS Voice preferred and CS Voice as secondary, or IMS PS Voice only. In cases, a change of the UE's usage setting or voice domain preference for E-UTRAN may trigger the UEs 101, 102 to perform a TAU procedure.

According to various first embodiments, a UE 101, 102 supporting CE mode B may detach and then reattach to the network whenever the UE's usage setting of the UE 101, 102 is changed from "voice centric" to "data centric," or vice versa, in order to update the UE radio capability information at the MME 121, changing the CE mode B support indication in the UE radio capability information from a value of "not supported" to a value of "supported", or vice versa. One drawback of the first embodiments is that such embodiments may be relatively expensive in terms of signaling overhead via the radio interface, including that such embodiments may require retrieval of the full new UE radio capability. In addition the change from "voice centric" to "data centric," or vice versa, might take place while the UE 101, 102 is operating in CE mode B, and therefore, signaling resources may be scarce when compared to operating in a normal or non-enhanced coverage mode.

According to various second embodiments, whenever the UE's usage setting is changed from voice centric to data centric, or vice versa, the MME 121 may update the UE radio capability during a TAU procedure for the UE 101, 102. In such embodiments, if the UE 101, 102 is performing an Attach procedure or a TAU procedure for a "first TAU following GERAN/UTRAN Attach," for a "UE radio capability update", or for indicating a change in the UE's usage setting from voice centric to data centric or vice versa if the UE is supports CE mode B, the MME 121 may delete (or mark as deleted) any UE Radio Capability information that it has stored for the UE 101, 102. Additionally, if the MME 121 sends an S1 interface initial context setup request message or a UE radio capability match request message during the Attach/TAU procedure, the MME 121 may not send any UE Radio Capability information to the RAN node 111, 112 in that message. This may trigger the E-UTRAN node 111, 112 to request the UE Radio Capability from the UE 101, 102 and to upload it to the MME 121 in an S1 interface UE capability info indication message. In such embodiments, the UE Radio Capability may include an indication about the support of CE mode B by the UE 101, 102. Upon receipt of the UE Radio Capability in the UE capability info indication message, the MME 121 may store the UE Radio Capability information, and include it in further INITIAL CONTEXT SETUP REQUEST or UE RADIO CAPABILITY MATCH REQUEST messages in cases other than an Attach or TAU procedure for the "first TAU following GERAN/UTRAN Attach" and "UE radio capability update" procedure.

The second embodiments may include an update to section 5.11.2 of 3GPP technical specification (TS) 23.401 version (v) 15.2.0 (2017-12) as follows:

If the UE is performing an Attach procedure or a Tracking Area Update procedure for the "first TAU following GERAN/UTRAN Attach" or for "UE radio capability update" or for the "UE supporting CE Mode B and changing the UE's usage setting from voice centric to data centric (and vice versa)", the MME shall delete (or mark as deleted) any UE Radio Capability information that it has stored, and, if the MME sends an S1 interface INITIAL CONTEXT SETUP REQUEST or UE RADIO CAPABILITY MATCH REQUEST message during that procedure, the MME shall not send any UE Radio Capability information to the E-UTRAN in that message. This triggers the E-UTRAN to request the UE Radio Capability from the UE and to upload it to the MME in the S1 interface UE CAPABILITY INFO INDICATION message. The MME stores the UE Radio Capability information, and include it in further INITIAL CONTEXT SETUP REQUEST or UE RADIO CAPABILITY MATCH REQUEST messages in other cases than Attach procedure, Tracking Area Update procedure for the "first TAU following GERAN/UTRAN Attach" and "UE radio capability update" procedure.

The second embodiments may be better as compared to the first embodiments in terms of radio signaling overhead; however, the second embodiments may only be applicable for a UE 101, 102 that is in EPS Mobility Management (EMM)-Idle mode at the moment when the UE's usage setting of the UE 101, 102 is changed. If the UE 101, 102 is already in EMM-Connected mode, and the UE radio capability information element (IE) has already been provided by the MME 121 to the E-UTRAN node 111, 112 with an S1 interface INITIAL CONTEXT SETUP REQUEST or UE RADIO CAPABILITY MATCH REQUEST message, then it will not be updated as long as the UE 101, 102 remains in EMM-Connected mode. If the UE radio capability IE has not yet been provided by the MME 121 to the E-UTRAN node 111, 112, then the MME 121 may send an S1 interface INITIAL CONTEXT SETUP REQUEST or UE RADIO CAPABILITY MATCH REQUEST message without including the UE radio capability IE. In response to receipt of such an S1 message, the E-UTRAN node 111, 112 may retrieve the UE radio capability from the UE 101, 102. In order to allow the UE's usage setting to be updated while the UE 101, 102 is in EMM-Connected mode, a new indicator/flag/parameter called "CE mode B restriction parameter" may be added to the S1-AP message to be sent by MME 121 to the RAN node 111, 112. The new indicator/flag/parameter may indicate whether the UE 101, 102 is "restricted" or "not restricted" for CE mode B. The S1-AP message may be an INITIAL CONTEXT SETUP REQUEST message, a HANDOVER REQUEST message, a PATH SWITCH REQUEST ACKNOWLEDGE message, a CONNECTION ESTABLISHMENT INDICATION message, a DOWNLINK NAS TRANSPORT message carrying a TAU accept message, or some other like message.

A variant of the second embodiments may be used for UE 101, 102 that is in EMM-Connected mode when the UE's usage setting is changed from data centric to voice centric, or vice versa, and the UE radio capability IE has already been provided by the MME 121 to the E-UTRAN node 111, 112. In such embodiments, the MME 121 may receive a TAU request message from the UE 101, 102, where the TAU Request includes "UE radio capability information update needed" indicator. In response to receipt of a TAU Request message including this indicator or indicating a change of the UE's usage setting from data centric to voice centric, or vice versa, the MME 121 may send an S1 interface message, such as a UE RADIO CAPABILITY MATCH REQUEST message without a UE radio capability IE, and instead include an "update needed" indicator.

When the E-UTRAN node 111, 112 receives the S1 interface UE RADIO CAPABILITY MATCH REQUEST message with the "update needed" indicator, the E-UTRAN node 111, 112 may initiate an RRC UE Capability Enquiry procedure to retrieve the UE radio capability from the UE 101, 102, even if the E-UTRAN node 111, 112 has already received a UE radio capability IE from the MME 121 with an earlier S1 interface message (for example, in an INITIAL CONTEXT SETUP REQUEST or UE RADIO CAPABILITY MATCH REQUEST message) or from the UE 101, 102 during an earlier RRC UE Capability Enquiry procedure. The UE 101, 102 may provide updated UE Capability information to the E-UTRAN node 111, 112 including the updated CE mode B support indication indicating a value of "not supported" if the UE's usage setting is changed from data centric to voice centric, or a value of "supported", if the UE's usage setting is changed from voice centric to data centric. After the E-UTRAN node 111, 112 obtains the UE Capability information in an RRC UE Capability Enquiry response message, the E-UTRAN node 111, 112 may provide an updated UE radio capability IE to the MME 121 in an S1-AP UE Capability information Indication message. The MME 121 may then store the UE radio capability, including the CE mode B support indication, for subsequent accesses by the UE 101, 102.

In addition to updating the UE's usage setting and/or support of CE mode B, the enhanced TAU procedure with "UE radio capability information update needed" indicator discussed with respect to the variation of the second embodiments may be used to update any radio capability parameters. For example, a supported UE category, supported bands or band combinations, support of FDD or TDD modes, and the like may be updated using the variant of the second embodiments.

Furthermore, for cases where the UE 101, 102 determines that a new UE radio capability should be signaled to the network when the UE 101, 102 is already in EMM-Connected mode, the UE 101, 102 may need to keep using the previously or currently enabled UE radio capability until the UE 101, 102 has signaled the new UE radio capability to the E-UTRAN node 111,112. If the UE 101, 102 immediately switches to using the new UE radio capability and configures its radiofrequency circuitry and physical layer accordingly, and the E-UTRAN node 111,112 initiates an RRC procedure based on the old UE radio capability that RRC procedure may fail.

According to various third embodiments, the MME 121 may use the UE's usage setting as indicated by the Attach/TAU request to determine if CE mode B should be restricted, and may inform the E-UTRAN node 111, 112 about the determined restriction whenever the UE's usage setting is changed from voice centric to data centric, or vice versa. In such embodiments, the UE 101, 102 may send a "Voice domain preference and UE's usage setting" IE in an Attach Request, TAU request, and/or RAU request message to the MME 121 to indicate the UE's usage setting and voice domain preference for E-UTRAN. The voice domain preference for E-UTRAN may indicate whether the UE 101, 102 is configured as CS voice only, CS voice preferred and IMS packet switched (PS) voice as secondary, IMS PS voice preferred and CS voice as secondary, or IMS PS voice only.

In the third embodiments, if the UE 101, 102 supports CE mode B, then the UE 101, 102 may send a CE mode B capability to the E-UTRAN node 111, 112 and/or the MME 121 irrespective of its current UE's usage setting ("Voice Centric" or "Data Centric"). If the UE 101, 102 supports "CE mode B" and the UE's usage setting is set to voice centric, then the UE 101, 102 may not operate in CE mode B, may locally disable CE mode B, and the UE 101, 102 may not extend NAS timers and/or may or may not initiate any dedicated bearer establishment (for example, voice over LTE (VoLTE), etc.).

One difference between the third embodiments and the second embodiments is that, if the UE 101, 102 supports CE mode B and UE's usage setting is set to voice centric, in the second embodiments the UE 101, 102 does not send a CE mode support capability indicating "CE mode B supported" to the MME 121 during an Attach/TAU/RAU procedure.

By contrast, in the third embodiments, the UE 101, 102 always reports its correct capabilities. Another difference is that the second embodiments may require updating the UE radio capability stored at the MME 121 when the UE 101, 102 switches from "Voice Centric" to "Data Centric," and vice versa, whereas the third embodiments may not require updating the UE radio capability stored at the MME 121 when the UE 101, 102 switches from "Voice Centric" to "Data Centric," and vice versa.

According to various fourth embodiments, the UE 101, 102 may provide two versions of the UE radio capability to the MME 121 during an Attach/TAU/RAU procedure. One version of the UE Radio Capability may be used for the voice centric UE's usage setting and a second version of the UE Radio Capability information may be used for the data centric usage setting. This may force the MME 121 to select the correct UE Radio Capability during the TAU/RAU procedure whenever the UE's usage setting is changed from voice centric to data centric, or vice versa. In such embodiments, the MME 121 may store the two versions of the UE Radio Capability information, and the MME 121 may send the UE Radio Capability corresponding to UE's usage setting to the E-UTRAN 111, 112. Additionally, if the UE 101, 102 supports CE mode B, the UE's usage setting is changed, and the UE 101, 102 is already in the EMM-Connected mode, the MME 121 may send the UE Radio Capability to the E-UTRAN node 111, 112 in a Connection Establishment Indication message, Downlink NAS Transport message, or some other suitable message.

One difference between the fourth embodiments and the second embodiments may include the use of the two versions of the UE radio capability sent by the UE 101, 102 and stored by the MME 121. Communicating and storing two versions of the UE Radio Capability may require more signaling and storage overhead at the UE 101, 102 and the MME 121. However, the fourth embodiments can be simplified so the second version contain only the changes in the radio capability instead of sending complete radio capability. Additionally, the fourth embodiments may be more generic and can be used if more changes are proposed in future, such as implementing new CE modes, new CE mechanisms, or the like.

According to various fifth embodiments, the MME 121 may analyze the UE Radio Capability information and may modify and provide updated UE Radio Capability to the E-UTRAN node 111, 112 whenever the UE's usage setting is changed from voice centric to data centric, or vice versa. Additionally, if the UE 101, 102 supports CE mode B, the UE's usage setting is changed, and the UE 101, 102 is already in the EMM-Connected mode, the MME 121 may send the UE Radio Capability to the E-UTRAN node 111, 112 in a Connection Establishment Indication message, Downlink NAS Transport message, or some other suitable message. One drawback of the fifth embodiments is that it may require updates to the implementation/operation of the MME 121 to analyze and/or modify the UE radio capability information.

In the various embodiments discussed herein, a new indicator, flag, parameter called "CE mode B restriction parameter" may be added to an S1-AP message that is sent from MME 121 to E-UTRAN node 111, 112 (e.g. INITIAL CONTEXT SETUP REQUEST message, HANDOVER REQUEST message, PATH SWITCH REQUEST ACKNOWLEDGE message, CONNECTION ESTABLISHMENT INDICATION message, and DOWNLINK NAS TRANSPORT message carrying the TAU ACCEPT message including when the UE initiates a TAU in EMM-Connected mode after PS handover) when the UE's usage setting is changed while the UE 101, 102 is in EMM-Connected mode or EMM-Idle mode. This new indicator may indicate whether CE mode B is "restricted" or "not restricted" for the UE 101, 102. For example, if the UE's usage setting of UE 101, 102 is set to voice centric, then the UE 101, 102 may not operate in CE mode B (or CE mode B is "restricted"). By contrast, if the UE's usage setting of UE 101, 102 is set to data centric, then the UE 101, 102 may operate in CE mode B (or CE mode B is "not restricted"). In some of the various embodiments discussed herein, the CE mode B restriction parameter may be included in a non-access stratum (NAS) message (e.g. Attach Accept, TAU Accept, etc.) to be sent by the MME 121 to the UE 101, 102.

In some of the embodiments discussed herein, the "CE mode B restriction parameter" may be set by the MME 121 based on the UE's usage setting. If the UE 101, 102 supports CE mode B and the UE's usage setting is set to "Voice Centric," then the MME 121 may set the CE mode B restriction parameter to a first value to indicate that the UE 101, 102 is "restricted" for CE mode B. In an example, the first value may be an integer, such as "1," or a string, such as "restricted," or a flag which is set to "1". If the UE 101, 102 supports CE mode B and the UE's usage setting is set to "Data Centric," the MME 121 may set the CE mode B restriction parameter to a second value to indicate that the UE 101, 102 is "not restricted" for CE mode B. In an example, the second value may be an integer, such as "0," or a string, such as "not restricted," or a flag which is set to "0."

In the various embodiments discussed herein, when the UE's usage setting changes from "data centric" to "voice centric," then the CE mode B restriction parameter in an S1-AP message (e.g. INITIAL CONTEXT SETUP REQUEST message, HANDOVER REQUEST message, PATH SWITCH REQUEST ACKNOWLEDGE message, CONNECTION ESTABLISHMENT INDICATION message, and DOWNLINK NAS TRANSPORT message carrying the TAU ACCEPT message) may be set to the first value (for example, "1", "restricted", etc.) indicating that the UE 101, 102 is "restricted" for CE mode B. If the UE's usage setting changes from "voice centric" to "data centric" then CE mode B restriction parameter in an S1-AP message (e.g. INITIAL CONTEXT SETUP REQUEST message, HANDOVER REQUEST message, PATH SWITCH REQUEST ACKNOWLEDGE message, CONNECTION ESTABLISHMENT INDICATION message, and DOWNLINK NAS TRANSPORT message carrying the TAU ACCEPT message) may be set to the second value (e.g. "0", "not restricted", etc.) indicating that the UE 101, 102 is "not restricted" for CE mode B. In some embodiments, the "CE mode B restriction parameter" may be included in the various S1-AP messages mentioned previously to indicate whether UE 101, 102 is by subscription "restricted" or "not restricted" for CE mode B.

In some embodiments, values for the CE mode B restriction parameter different than those discussed previously may be used to indicate whether the UE 101, 102 is "restricted" or "not restricted" for CE mode B. In some embodiments, the "CE mode B restriction parameter" may be a variable of type "enumerated," for example, the "CE mode B restriction parameter" may be another code point value of the existing "Enhanced Coverage Restricted parameter" included in the S1-AP messages mentioned previously.

In the various embodiments discussed herein, the MME 121 may store the "CE mode B restriction parameter" parameter in an MM context of the UE 101, 102 or the MME 121 may derive its value, when needed, from the UE's usage setting parameter {possible values: "Data Centric", "Voice Centric"} already stored in the UE context (and/or MM Context).

In the various embodiments discussed herein, if "CE mode B restriction parameter" is set to the "restricted" value, then the UE 101, 102 and/or the MME 121 may not start or extend extended NAS timer(s). In such embodiments, the MME 121 may reject any request for dedicated bearer establishment for the UE 101, 102 if the CE mode B restriction parameter of the UE 101, 102 is set to the "not restricted" value.

In the various embodiments discussed herein, a NAS entity at the UE 101, 102 may disable the usage of CE mode B (for example, due to change from "data centric" to "voice centric," or vice versa), and the NAS entity may inform an access stratum (AS) entity at the UE 101, 102 not to enable procedures applicable to CE mode B in idle or connected mode, such as for cell reselection, random access, measurement gaps, etc. When the NAS entity enables usage of CE mode B, the NAS entity may inform the AS entity to enable applicable CE mode B procedures in idle or connected mode.

Figure 2:
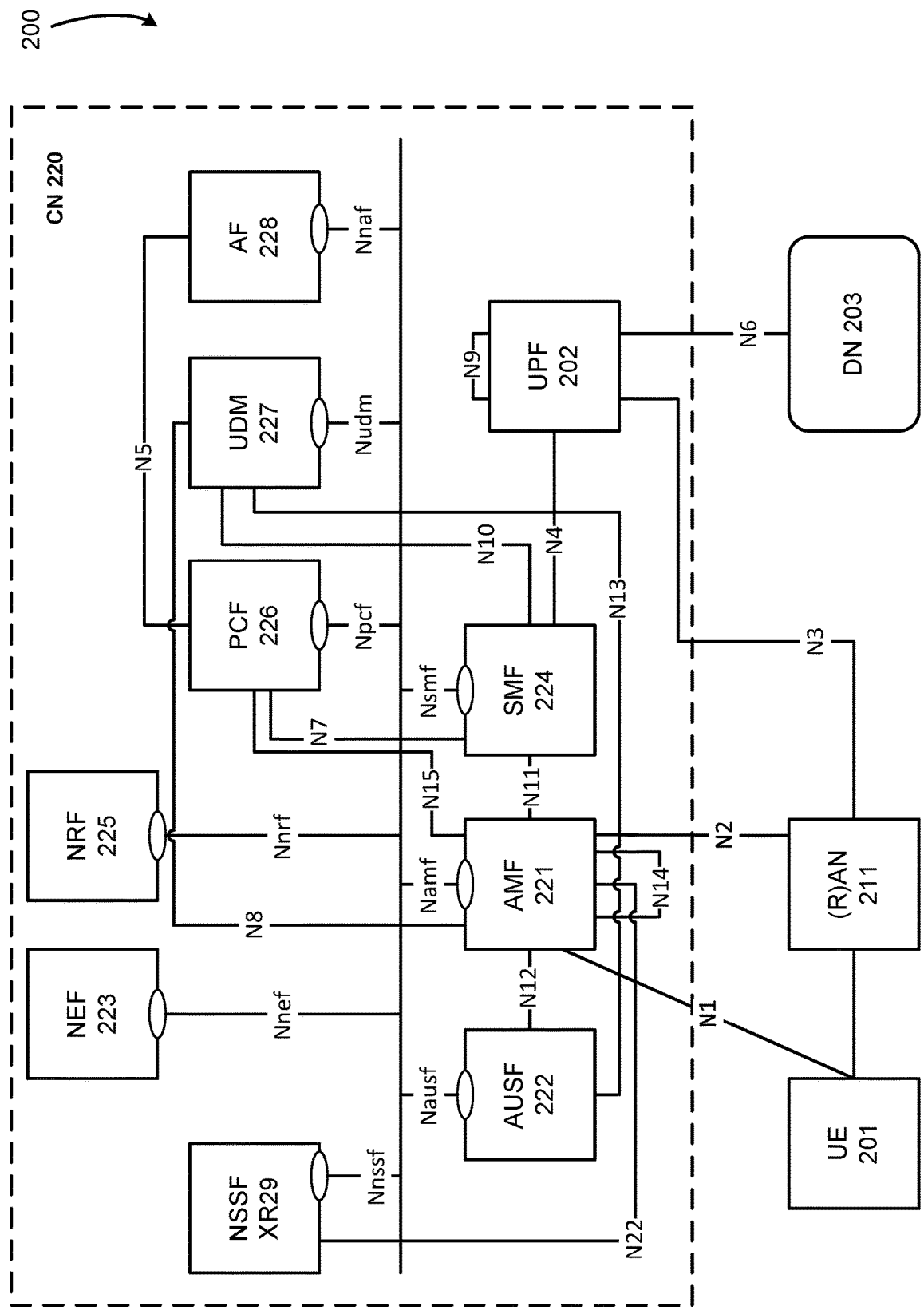
FIG. 2 illustrates another example system architecture of a network, in accordance with various embodiments

FIG. 2 illustrates an architecture of a system 200 of a network in accordance with some embodiments. The system 200 is shown to include a UE 201, which may be the same or similar to UEs 101 and 102 discussed previously; a RAN node 211, which may be the same or similar to RAN nodes 111 and 112 discussed previously; a Data network (DN) 203, which may be, for example, operator services, Internet access or 3rd party services; and a 5G Core Network (5GC or CN) 220.

Similar to UEs 101, 102, the 5GC-capable UE 201 may also perform an access domain selection procedure for UE originating voice calls. The access domain selection may be based on, inter alia, a state of the UE 201 in the IMS (for example, registered or unregistered), whether the UE 201 supports IMS over PS session, the UE 201 capability for operating in dual-registration mode with selective PDU Session transfer, and whether the UE 201 is expected to behave in a "Voice centric" or "Data Centric" way. For domain selection for originating voice calls, the UEs, 101, 102 may be set to behave as "Voice centric" or "Data Centric."

When the 5GC-capable UE 201 is set to "voice centric" for SGS, the UE 201 will always try to ensure that voice service is possible. This means that a voice centric UE 201 may select a cell that is not only connected to the 5GC 220. The UE 201 may also disable its 5GS capabilities and reselect to an E-UTRAN node 111,112 first (if available) and may perform voice domain selection as discussed previously with regard to FIG. 1. When UE 201 is set to "data centric," the UE 201 does not disable 5GS capabilities (or perform any reselection) if voice services cannot be obtained. This means that a data centric UE 201 will not reselect to another RAT even if voice service in 5GC cannot be provided. Additionally, if the UE 201 is configured to support IMS voice, the UE 201 may include a "UE's usage setting" IE in Registration Update Request messages (discussed infra). The UE's usage setting indicates whether the UE behaves in a "voice centric" or "data centric" way.

The CN 220 may include an Authentication Server Function (AUSF) 222; an Access and Mobility Management Function (AMF) 221; a Session Management Function (SMF) 224; a Network Exposure Function (NEF) 223; a Policy Control function (PCF) 226; a Network Function (NF) Repository Function (NRF) 225; a Unified Data Management (UDM) 227; an Application Function (AF) 228; a User Plane Function (UPF) 202; and a Network Slice Selection Function (NSSF) 229.

The UPF 202 may act as an anchor point for intra-RAT and inter-RAT mobility, an external PDU session point of interconnect to DN 203, and a branching point to support multi-homed PDU session. The UPF 202 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (for example, SDF to QoS flow mapping), transport level packet marking in the uplink and downlink, and downlink packet buffering and downlink data notification triggering. UPF 202 may include an uplink classifier to support routing traffic flows to a data network. The DN 203 may represent various network operator services, Internet access, or third party services. NY 203 may include, or be similar to application server 130 discussed previously. The UPF 202 may interact with the SMF 224 via an N4 reference point between the SMF 224 and the UPF 202.

The AUSF 222 may store data for authentication of UE 201 and handle authentication related functionality. The AUSF 222 may facilitate a common authentication framework for various access types. The AUSF 222 may communicate with the AMF 221 via an N12 reference point between the AMF 221 and the AUSF 222; and may communicate with the UDM 227 via an N13 reference point between the UDM 227 and the AUSF 222. Additionally, the AUSF 222 may exhibit an Nausf service-based interface.

The AMF 221 may be responsible for registration management (for example, for registering UE 201, etc.), connection management, reachability management, mobility management, and lawful interception of AMF-related events, and access authentication and authorization. The AMF 221 may be a termination point for the an N11 reference point between the AMF 221 and the SMF 224. The AMF 221 may provide transport for Session Management (SM) messages between the UE 201 and the SMF 224, and act as a transparent proxy for routing SM messages. AMF 221 may also provide transport for short message service (SMS) messages between UE 201 and an SMS function (SMSF) (not shown by FIG. 2). AMF 221 may act as Security Anchor Function (SEA), which may include interaction with the AUSF 222 and the UE 201, receipt of an intermediate key that was established as a result of the UE 201 authentication process. Where USIM based authentication is used, the AMF 221 may retrieve the security material from the AUSF 222. AMF 221 may also include a Security Context Management (SCM) function, which receives a key from the SEA that it uses to derive access-network specific keys. Furthermore, AMF 221 may be a termination point of RAN CP interface, which may include or be an N2 reference point between the (R)AN 211 and the AMF 221; and the AMF 221 may be a termination point of NAS (N1) signalling, and perform NAS ciphering and integrity protection.

AMF 221 may also support NAS signalling with a UE 201 over an N3 interworking-function (IWF) interface. The N3IWF may be used to provide access to untrusted entities. N3IWF may be a termination point for the N2 interface between the (R)AN 211 and the AMF 221 for the control plane, and may be a termination point for the N3 reference point between the (R)AN 211 and the UPF 202 for the user plane. As such, the AMF 221 may handle N2 signalling from the SMF 224 and the AMF 221 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 may exhibit an Namf service-based interface, and may be a termination point for an N14 reference point between two AMFs 221 and an N17 reference point between the AMF 221 and a 5G-Equipment Identity Register (5G-EIR) (not shown by FIG. 2).

The UE 201 may need to register with the AMF 221 in order to receive network services. Registration Management (RM) is used to register or deregister the UE 221 with the network (for example, AMF 221), and establish a UE context in the network (for example, AMF 221). The UE 201 may operate in an RM-REGISTERED state or an RM-DEREGISTERED state. In the RM-DEREGISTERED state, the UE 201 is not registered with the network, and the UE context in AMF 221 holds no valid location or routing information for the UE 201 so the UE 201 is not reachable by the AMF 221. In the RM-REGISTERED state, the UE 201 is registered with the network, and the UE context in AMF 221 may hold a valid location or routing information for the UE 201 so the UE 201 is reachable by the AMF 221. In the RM-REGISTERED state, the UE 201 may perform mobility Registration Update procedures, perform periodic Registration Update procedure triggered by expiration of the periodic update timer (for example, to notify the network that the UE 201 is still active), and perform a Registration Update procedure to update UE capability information or to re-negotiate protocol parameters with the network, among others.

The AMF 221 may store one or more RM contexts for the UE 201, where each RM context is associated with a specific access to the network. The RM context may be a data structure, database object, etc. that indicates or stores, inter alia, a registration state per access type and the periodic update timer. The AMF 221 may also store a 5GC MM context that may be the same or similar to the (E)MM context discussed previously. In various embodiments, the AMF 221 may store a CE mode B Restriction parameter of the UE 201 in an associated MM context or RM context. The AMF 221 may also derive the value, when needed, from the UE's usage setting parameter {possible values: "Data Centric", "Voice Centric"} already stored in the UE context (and/or MM/RM Context).

Connection Management (CM) may be used to establish and release a signaling connection between the UE 201 and the AMF 221 over the N1 interface. The signaling connection is used to enable NAS signaling exchange between the UE 201 and the CN 220, and comprises both the AN signaling connection between the UE and the Access Network (AN) (for example, RRC connection or UE-N3IWF connection for Non-3GPP access) and the N2 connection for the UE 201 between the AN (for example, RAN 211) and the AMF 221. The UE 201 may operate in one of two CM states, CM-IDLE mode or CM-CONNECTED mode. When the UE 201 is operating in the CM-IDLE state/mode, the UE 201 may have no NAS signaling connection established with the AMF 221 over the N1 interface, and there may be (R)AN 211 signaling connection (for example, N2 and/or N3 connections) for the UE 201. When the UE 201 is operating in the CM-CONNECTED state/mode, the UE 201 may have an established NAS signaling connection with the AMF 221 over the N1 interface, and there may be a (R)AN 211 signaling connection (for example, N2 and/or N3 connections) for the UE 201. Establishment of an N2 connection between the (R)AN 211 and the AMF 221 may cause the UE 201 to transition from CM-IDLE mode to CM-CONNECTED mode, and the UE 201 may transition from the CM-CONNECTED mode to the CM-IDLE mode when N2 signaling between the (R)AN 211 and the AMF 221 is released.

The SMF 224 may be responsible for session management (for example, session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 224 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 224 may be included in the system 200, which may be between another SMF 224 in a visited network and the SMF 224 in the home network in roaming scenarios. Additionally, the SMF 224 may exhibit the Nsmf service-based interface.

The NEF 223 may provide means for securely exposing the services and capabilities provided by 3GPP network functions for third party, internal exposure/re-exposure, Application Functions (for example, AF 228), edge computing or fog computing systems, etc. In such embodiments, the NEF 223 may authenticate, authorize, and/or throttle the AFs. NEF 223 may also translate information exchanged with the AF 228 and information exchanged with internal network functions. For example, the NEF 223 may translate between an AF-Service-Identifier and an internal 5GC information. NEF 223 may also receive information from other network functions (NFs) based on exposed capabilities of other network functions. This information may be stored at the NEF 223 as structured data, or at a data storage NF using a standardized interfaces. The stored information can then be re-exposed by the NEF 223 to other NFs and AFs, and/or used for other purposes such as analytics. Additionally, the NEF 223 may exhibit an Nnef service-based interface.

The NRF 225 may support service discovery functions, receive NF Discovery Requests from NF instances, and provide the information of the discovered NF instances to the NF instances. NRF 225 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 225 may exhibit the Nnrf service-based interface.

The PCF 226 may provide policy rules to control plane function(s) to enforce them, and may also support unified policy framework to govern network behaviour. The PCF 226 may also implement a front end (FE) to access subscription information relevant for policy decisions in a UDR of the UDM 227. The PCF 226 may communicate with the AMF 221 via an N15 reference point between the PCF 226 and the AMF 221, which may include a PCF 226 in a visited network and the AMF 221 in case of roaming scenarios. The PCF 226 may communicate with the AF 228 via an N5 reference point between the PCF 226 and the AF 228; and with the SMF 224 via an N7 reference point between the PCF 226 and the SMF 224. The system 200 and/or CN 220 may also include an N24 reference point between the PCF 226 (in the home network) and a PCF 226 in a visited network. Additionally, the PCF 226 may exhibit an Npcf service-based interface.

The UDM 227 may handle subscription-related information to support the network entities' handling of communication sessions, and may store subscription data of UE 201. For example, subscription data may be communicated between the UDM 227 and the AMF 221 via an N8 reference point between the UDM 227 and the AMF 221 (not shown by FIG. 2). The UDM 227 may include two parts, an application FE and a User Data Repository (UDR) (the FE and UDR are not shown by FIG. 2). The UDR may store subscription data and policy data for the UDM 227 and the PCF 226, and/or structured data for exposure and application data (including Packet Flow Descriptions (PFDs) for application detection, application request information for multiple UEs 201) for the NEF 223. The Nudr service-based interface may be exhibited by the UDR 221 to allow the UDM 227, PCF 226, and NEF 223 to access a particular set of the stored data, as well as to read, update (for example, add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 224 via an N10 reference point between the UDM 227 and the SMF 224. UDM 227 may also support SMS management, wherein an SMS-FE implements the similar application logic as discussed previously. Additionally, the UDM 227 may exhibit the Nudm service-based interface.

The AF 228 may provide application influence on traffic routing, access to the Network Capability Exposure (NCE), and interact with the policy framework for policy control. The NCE may be a mechanism that allows the 5GC and AF 228 to provide information to each other via NEF 223, which may be used for edge computing implementations. In such implementations, the network operator and third party services may be hosted close to the UE 201 access point of attachment to achieve an efficient service delivery through the reduced end-to-end latency and load on the transport network. For edge computing implementations, the 5GC may select a UPF 202 close to the UE 201 and execute traffic steering from the UPF 202 to DN 203 via the N6 interface. This may be based on the UE subscription data, UE location, and information provided by the AF 228. In this way, the AF 228 may influence UPF (re)selection and traffic routing. Based on operator deployment, when AF 228 is considered to be a trusted entity, the network operator may permit AF 228 to interact directly with relevant NFs. Additionally, the AF 228 may exhibit an Naf service-based interface.

The NSSF 229 may select a set of network slice instances serving the UE 201. The NSSF 229 may also determine allowed Network Slice Selection Assistance Information (NSSAI) and the mapping to the Subscribed Single-NSSAIs (S-NSSAIs), if needed. The NSSF 229 may also determine the AMF set to be used to serve the UE 201, or a list of candidate AMF(s) 221 based on a suitable configuration and possibly by querying the NRF 225. The selection of a set of network slice instances for the UE 201 may be triggered by the AMF 221 with which the UE 201 is registered by interacting with the NSSF 229, which may lead to a change of AMF 221. The NSSF 229 may interact with the AMF 221 via an N22 reference point between AMF 221 and NSSF 229; and may communicate with another NSSF 229 in a visited network via an N31 reference point (not shown by FIG. 2). Additionally, the NSSF 229 may exhibit an Nnssf service-based interface.

As discussed previously, the CN 220 may include an SMSF, which may be responsible for SMS subscription checking and verification, and relaying SM messages to/from the UE 201 to/from other entities, such as an SMS-GMSC/IWMSC/SMS-router. The SMS may also interact with AMF 221 and UDM 227 for notification procedure that the UE 201 is available for SMS transfer (for example, set a UE not reachable flag, and notifying UDM 227 when UE 201 is available for SMS).

The CN 220 may also include other elements that are not shown by FIG. 2, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (for example, UE contexts), via N18 reference point between any NF and the UDSF (not shown by FIG. 2). Individual NFs may share a UDSF for storing their respective unstructured data or individual NFs may each have their own UDSF located at or near the individual NFs. Additionally, the UDSF may exhibit an Nudsf service-based interface (not shown by FIG. 2). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 2 for clarity. In one example, the CN 220 may include an Nx interface, which is an inter-CN interface between the MME (for example, MME 121) and the AMF 221 in order to enable interworking between CN 220 and CN 120. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

In yet another example, system 200 may include multiple RAN nodes 211 wherein an Xn interface is defined between two or more RAN nodes 211 (for example, gNBs and the like) that connecting to 5GC 220, between a RAN node 211 (for example, gNB) connecting to 5GC 220 and an eNB (for example, a RAN node 111 of FIG. 1), and/or between two eNBs connecting to 5GC 220. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 201 in a connected mode (for example, CM-CONNECTED) including functionality to manage the UE mobility for connected mode between one or more RAN nodes 211. The mobility support may include context transfer from an old (source) serving RAN node 211 to new (target) serving RAN node 211; and control of user plane tunnels between old (source) serving RAN node 211 to new (target) serving RAN node 211. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The various components of the core network 120 and 220 may be referred to as "network elements." The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CNs 120, 220 may be implemented in one physical node or separate physical nodes including components to read and execute instructions from a machine-readable or computer-readable medium (for example, a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CNs 120, 220 may be referred to as a network slice, and a logical instantiation of a portion of the CNs 120, 220 may be referred to as a network sub-slice (for example, a network sub-slice may include the PGW 123 and the PCRF 126). NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 3:
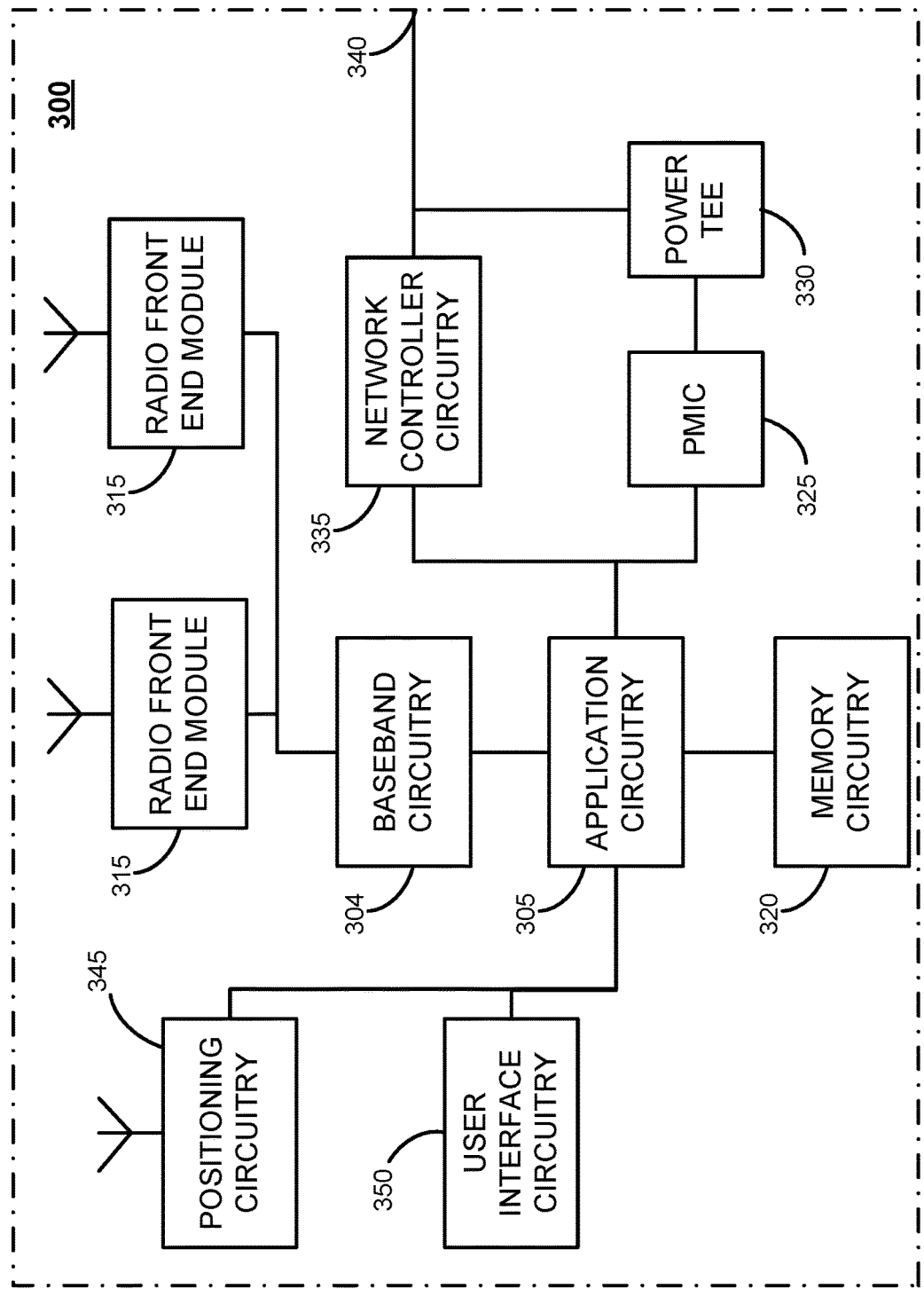
FIG. 3 depicts an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, RAN node, etc., such as the RAN nodes 111 and 112, and/or AP 106 shown and described previously. In other examples, the system 300 could be implemented in or by a UE or a core network node/entity. The system 300 may include one or more of application circuitry 305, baseband circuitry 304, one or more radio front end modules 315, memory 320, power management integrated circuitry (PMIC) 325, power tee circuitry 330, network controller 335, network interface connector 340, satellite positioning circuitry 345, and user interface 350. In some embodiments, the device 400 may include additional elements such as, for example, memory/storage, display, camera, sensor, or input/output (I/O) interface. In other embodiments, the components described below may be included in more than one device (for example, said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 305 may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 305 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 300 may not utilize application circuitry 305, and instead may include a special-purpose processor/controller to process IP data received from an EPC or SGC, for example.

Additionally or alternatively, application circuitry 305 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 305 may comprise logic blocks or logic fabric including and other interconnected resources that may be programmed to perform various functions, such as the procedures, methods, functions, etc. of the various embodiments discussed herein. In such embodiments, the circuitry of application circuitry 305 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

The baseband circuitry 304 may be implemented, for example, as a solder-down substrate including one or more integrated circuits, a single packaged integrated circuit soldered to a main circuit board or a multi-chip module containing two or more integrated circuits. Although not shown, baseband circuitry 304 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 304 may include protocol processing circuitry with one or more instances of control circuitry (not shown) to provide control functions for the digital baseband circuitry and/or radio frequency circuitry (for example, the radio front end modules 315).

User interface circuitry 350 may include one or more user interfaces designed to enable user interaction with the system 300 or peripheral component interfaces designed to enable peripheral component interaction with the system 300. User interfaces may include, but are not limited to one or more physical or virtual buttons (for example, a reset button), one or more indicators (for example, light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 315 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 315. The RFEMs 315 may incorporate both millimeter wave antennas and sub-millimeter wave antennas.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocol. In some implementations, the network controller circuitry 335 may include multiple controllers to provide connectivity to other networks using the same or different protocols.

The positioning circuitry 345, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (for example, Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 may comprise various hardware elements (for example, including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (for example, positioning circuitry 345 and/or positioning circuitry implemented by UEs 101, 102, or the like) to determine their GNSS position. The GNSS signals may include a pseudorandom code (for example, a sequence of ones and zeros) that is known to the GNSS receiver and a message that includes a time of transmission (ToT) of a code epoch (for example, a defined point in the pseudorandom code sequence) and the GNSS node position at the ToT. The GNSS receivers may monitor/measure the GNSS signals transmitted/broadcasted by a plurality of GNSS nodes (for example, four or more satellites) and solve various equations to determine a corresponding GNSS position (for example, a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (for example, an offset of the GNSS receiver clock relative to the GNSS node time). In some embodiments, the positioning circuitry 345 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 345 may provide data to application circuitry 305 which may include one or more of position data or time data. Application circuitry 305 may use the time data to synchronize operations with other radio base stations (for example, RAN nodes 111, 112, 211 or the like).

The components shown by FIG. 3 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an $I^2C$ interface, an SPI interface, point to point interfaces, and a power bus, among others.

Figure 4:
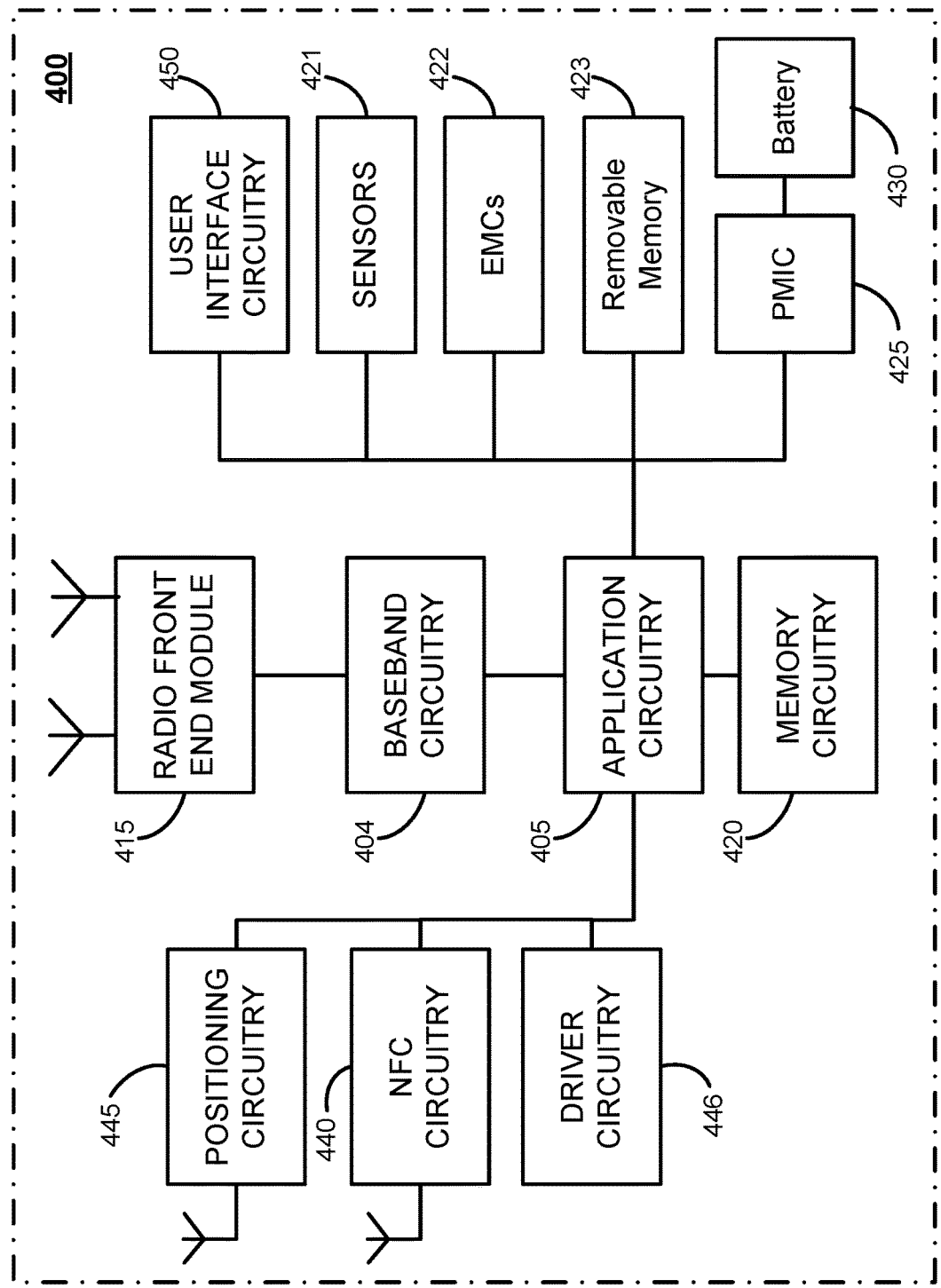
FIG. 4 depicts example components of a computer platform in accordance with various embodiments

FIG. 4 illustrates an example of a platform 400 (or "device 400") in accordance with various embodiments. In embodiments, the computer platform 400 may be suitable for use as UEs 101, 102, 201, application servers 130, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

The application circuitry 405 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (for example, graphics processors, application processors, etc.). The processors (or cores) may be coupled with or may include memory/storage and may be configured to execute instructions stored in the memory/storage to enable various applications or operating systems to run on the platform 400.

In some embodiments, processors of application circuitry 305/405 may process IP data packets received from an EPC or SGC.

Application circuitry 405 be or include a microprocessor, a multi-core processor, a multithreaded processor, an ultra-low voltage processor, an embedded processor, or other known processing element. In one example, the application circuitry 405 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation.

Additionally or alternatively, application circuitry 405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric including and other interconnected resources that may be programmed to perform various functions, such as the procedures, methods, functions, etc. of the various embodiments discussed herein. In such embodiments, the circuitry of application circuitry 405 may include memory cells (for example, erasable programmable read-only memory (EPROM), electrically erasable programmable read-only memory (EEPROM), flash memory, static memory (for example, static random access memory (SRAM), anti-fuses, etc.) used to store logic blocks, logic fabric, data, etc. in lookup-tables (LUTs) and the like.

The baseband circuitry 404 may be implemented, for example, as a solder-down substrate including one or more integrated circuits, a single packaged integrated circuit soldered to a main circuit board or a multi-chip module containing two or more integrated circuits. Although not shown, baseband circuitry 404 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 404 may include protocol processing circuitry with one or more instances of control circuitry (not shown) to provide control functions for the digital baseband circuitry and/or radio frequency circuitry (for example, the radio front end modules 415).

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include any number and type of memory devices used to provide for a given amount of system memory. As examples, the memory circuitry 420 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDlMMs or MiniDIMMs, and/or soldered onto a motherboard via a ball grid array (BGA). In low power implementations, the memory circuitry 420 s storage 108 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to coupled portable data storage devices with the platform 400. These portable data storage devices may be used for mass storage purposes, and may include, for example, flash memory cards (for example, Secure Digital (SD) cards, microSD cards, xD picture cards, and the like), and USB flash drives, optical discs, external HDDs, and the like.

The platform 400 may also include interface circuitry (not shown) that is used to connect external devices with the platform 400. The external devices connected to the platform 400 via the interface circuitry may include sensors 421, such as accelerometers, level sensors, flow sensors, temperature sensors, pressure sensors, barometric pressure sensors, and the like. The interface circuitry may be used to connect the platform 400 to electro-mechanical components (EMCs) 422, which may allow platform 400 to change its state, position, and/or orientation, or move or control a mechanism or system. The EMCs 422 may include one or more power switches, relays including electromechanical relays (EMRs) and/or solid state relays (SSRs), actuators (for example, valve actuators, etc.), an audible sound generator, a visual warning device, motors (for example, DC motors, stepper motors, etc.), wheels, thrusters, propellers, claws, clamps, hooks, and/or other like electro-mechanical components. In embodiments, platform 400 may be configured to operate one or more EMCs 422 based on one or more captured events and/or instructions or control signals received from a service provider and/or various clients.

In some implementations, the interface circuitry may connect the platform 400 with positioning circuitry 445, which may be the same or similar as the positioning circuitry 445 discussed with regard to FIG. 3.

In some implementations, the interface circuitry may connect the platform 400 with near-field communication (NFC) circuitry 440, which may include an NFC controller coupled with an antenna element and a processing device. The NFC circuitry 440 may be configured to read electronic tags and/or connect with another NFC-enabled device.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensors 421 and control and allow access to sensors 421, EMC drivers to obtain actuator positions of the EMCs 422 and/or control and allow access to the EMCs 422, a camera driver to control and allow access to an embedded image capture device, audio drivers to control and allow access to one or more audio devices.

The power management integrated circuitry (PMIC) 425 (also referred to as "power management circuitry 425" or the like) may manage power provided to various components of the platform 400. In particular, with respect to the baseband circuitry 404, the PMIC 425 may control power-source selection, voltage scaling, battery charging, or DC-to-DC conversion. The PMIC 425 may often be included when the platform 400 is capable of being powered by a battery 430, for example, when the device is included in a UE 101, 102, 201.

In some embodiments, the PMIC 425 may control, or otherwise be part of, various power saving mechanisms of the platform 400. For example, if the platform 400 is in an RRC_Connected state, where it is still connected to the RAN node as it expects to receive traffic shortly, then it may enter a state known as Discontinuous Reception Mode (DRX) after a period of inactivity. During this state, the platform 400 may power down for brief intervals of time and thus save power. If there is no data traffic activity for an extended period of time, then the platform 400 may transition off to an RRC_Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block 128 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 400 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I$^2$C interface, an SPI interface, point to point interfaces, and a power bus, among others.

Figure 5:
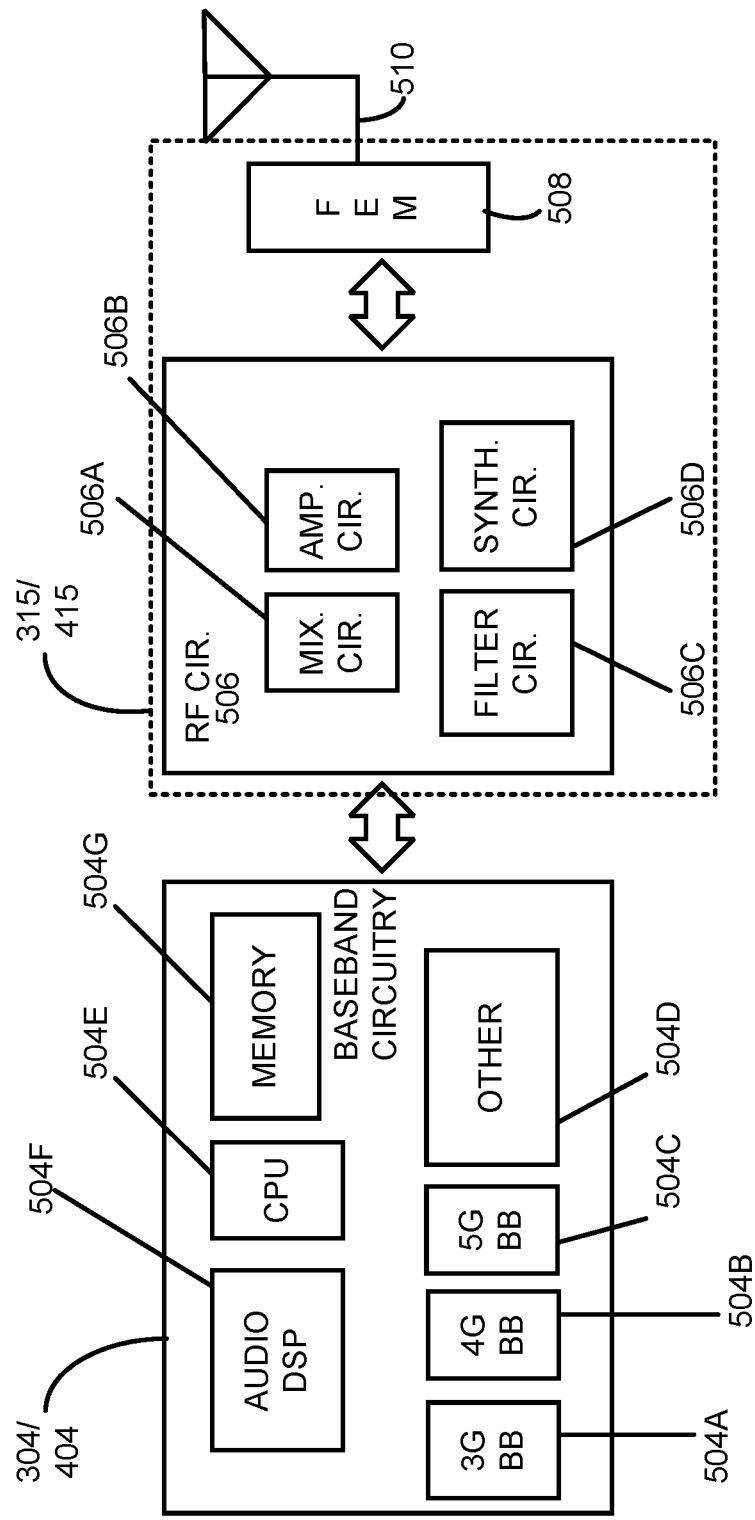
FIG. 5 depicts example components of baseband circuitry and radio frequency circuitry in accordance with various embodiments.

FIG. 5 illustrates example components of baseband circuitry 304/404 and radio front end modules (RFEM) 315/415 in accordance with some embodiments. As shown, the RFEM 315/415 may include Radio Frequency (RF) circuitry 506, front-end module (FEM) circuitry 508, one or more antennas 510 coupled together at least as shown.

The baseband circuitry 304/404 may include circuitry such as, but not limited to, one or more single-core or multi-core processors. The baseband circuitry 304/404 may include one or more baseband processors or control logic to process baseband signals received from a receive signal path of the RF circuitry 506 and to generate baseband signals for a transmit signal path of the RF circuitry 506. Baseband processing circuity 304/404 may interface with the application circuitry 305/405 for generation and processing of the baseband signals and for controlling operations of the RF circuitry 506. For example, in some embodiments, the baseband circuitry 304/404 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (for example, second generation (2G), sixth generation (6G), etc.). The baseband circuitry 304/404 (for example, one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 304/404 may include Fast-Fourier Transform (FFT), precoding, or constellation mapping/demapping functionality. In some embodiments, encoding/decoding circuitry of the baseband circuitry 304/404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304/404 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304/404 and the application circuitry 305/405 may be implemented together such as, for example, on a system on a chip (SOC).

In some embodiments, the baseband circuitry 304/404 may provide for communication compatible with one or more radio technologies. For example, in some embodiments, the baseband circuitry 304/404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 304/404 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 304/404. RF circuitry 506 may also include a transmit signal path which may include circuitry to up-convert baseband signals provided by the baseband circuitry 304/404 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 304/404 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 304/404 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (for example, Hartley image rejection). In some embodiments, the mixer circuitry 506a of the receive signal path and the mixer circuitry 506a may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 304/404 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 304/404 or the applications processor 305/405 depending on the desired output frequency. In some embodiments, a divider control input (for example, N) may be determined from a look-up table based on a channel indicated by the applications processor 305/405.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (for example, to the RF circuitry 506). The transmit signal path of the FEM circuitry 508 may include a power amplifier (PA) to amplify input RF signals (for example, provided by RF circuitry 506), and one or more filters to generate RF signals for subsequent transmission (for example, by one or more of the one or more antennas 510).

Processors of the application circuitry 305/405 and processors of the baseband circuitry 304/404 may be used to execute elements of one or more instances of a protocol stack. For example, processors of the baseband circuitry 304/404, alone or in combination, may be used execute Layer 3, Layer 2, or Layer 1 functionality, while processors of the baseband circuitry 304/404 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
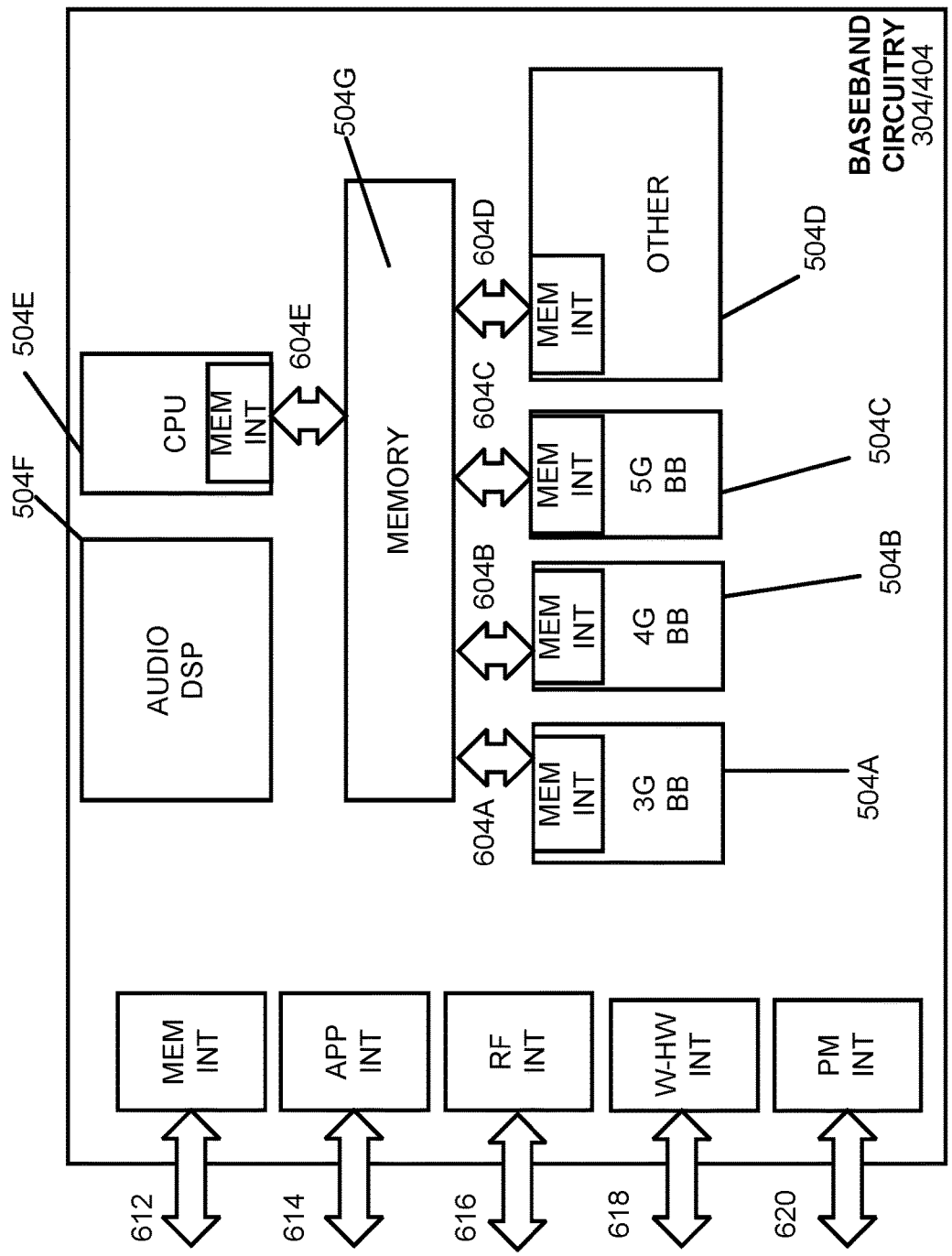
FIG. 6 depicts example interfaces of baseband circuitry in accordance with various embodiments.

FIG. 6 illustrates example interfaces of baseband circuitry in accordance with some embodiments. As discussed above, the baseband circuitry 304/404 of FIGS. 3-4 may comprise processors 504A-504E and a memory 504G utilized by said processors. Each of the processors 504A-504E may include a memory interface, 604A-604E, respectively, to send/receive data to/from the memory 504G.

The baseband circuitry 304/404 may further include one or more interfaces to communicatively couple to other circuitries/devices, such as a memory interface 612 (for example, an interface to send/receive data to/from memory external to the baseband circuitry 304/404), an application circuitry interface 614 (for example, an interface to send/receive data to/from the application circuitry 305/405 of FIGS. 3-4), an RF circuitry interface 616 (for example, an interface to send/receive data to/from RF circuitry 506 of FIG. 5), a wireless hardware connectivity interface 618 (for example, an interface to send/receive data to/from Near Field Communication (NFC) components, Bluetooth® components (for example, Bluetooth® Low Energy), Wi-Fi® components, and other communication components), and a power management interface 620 (for example, an interface to send/receive power or control signals to/from the PMIC 425.

Figure 7:
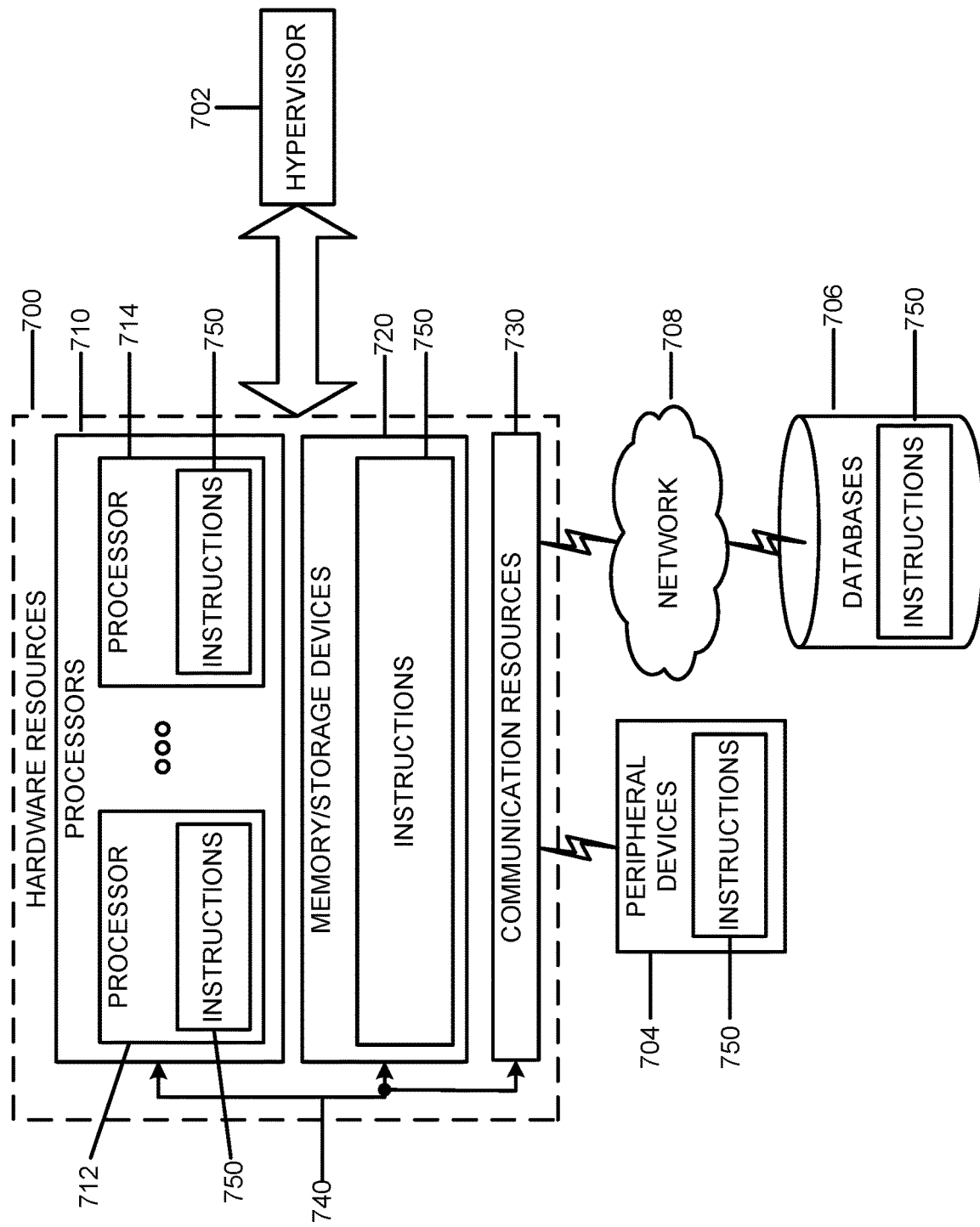
FIG. 7 depicts example components capable to perform any one or more of the methodologies discussed herein, according to various example embodiments.

FIG. 7 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (for example, NFV) is utilized, a hypervisor 702 may be executed to provide an execution environment for one or more network slices/sub-slices to utilize the hardware resources 700. A "virtualized resource" may refer to compute, storage, and/or network resources provided by virtualization infrastructure to an application, device, system, etc.

The processors 710 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (for example, for coupling via a Universal Serial Bus (USB)), cellular communication components, NFC components, Bluetooth® components (for example, Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (for example, within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

Figure 8:
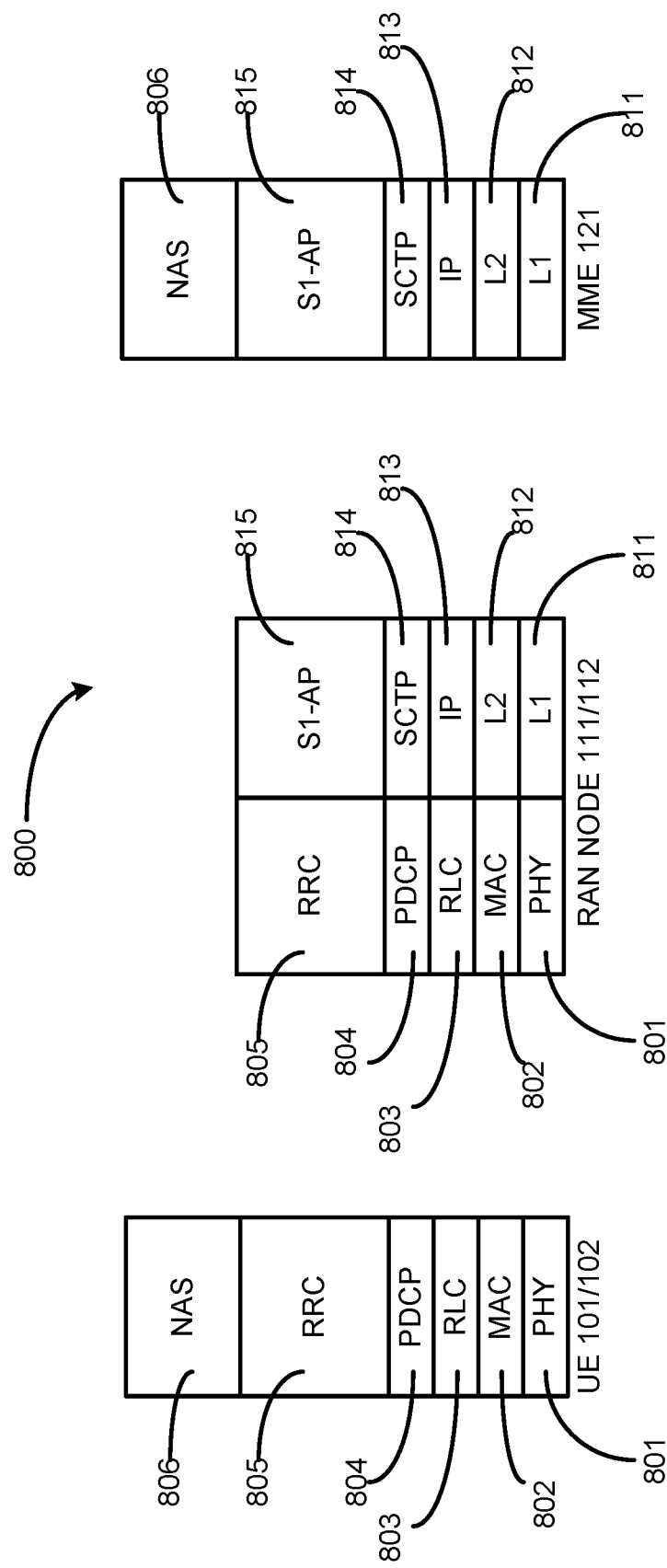
FIG. 8 is an illustration of a control plane protocol stack in accordance with various embodiments.

FIG. 8 is an illustration of a control plane protocol stack in accordance with some embodiments. In this embodiment, a control plane 800 is shown as a communications protocol stack between the UE 101 (or alternatively, the UE 102), the RAN node 111 (or alternatively, the RAN node 112), and the MME 121.

The PHY layer 801 may transmit or receive information used by the MAC layer 802 over one or more air interfaces. The PHY layer 801 may further perform link adaptation or adaptive modulation and coding (AMC), power control, cell search (for example, for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (for example, ciphering, deciphering, integrity protection, integrity verification, etc.).

The main services and functions of the RRC layer 805 may include broadcast of system information (for example, included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (for example, RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (for example, an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 101 and the MME 121. The NAS protocols 806 support the mobility of the UEs 101, 102 and the session management procedures to establish and maintain IP connectivity between the UE 101 and the P-GW 123.

The S1 Application Protocol (S1-AP) layer 815 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 111 and the MME 121 based, in part, on the IP protocol, supported by the IP layer 813. The L2 layer 812 and the L1 layer 811 may refer to communication links (for example, wired or wireless) used by the RAN node 111, 112 and the MME 121 to exchange information.

The RAN node 111 and the MME 121 may utilize an S1-MME interface to exchange control plane data via a protocol stack comprising the L1 layer 811, the L2 layer 812, the IP layer 813, the SCTP layer 814, and the S1-AP layer 815.

Figure 9:
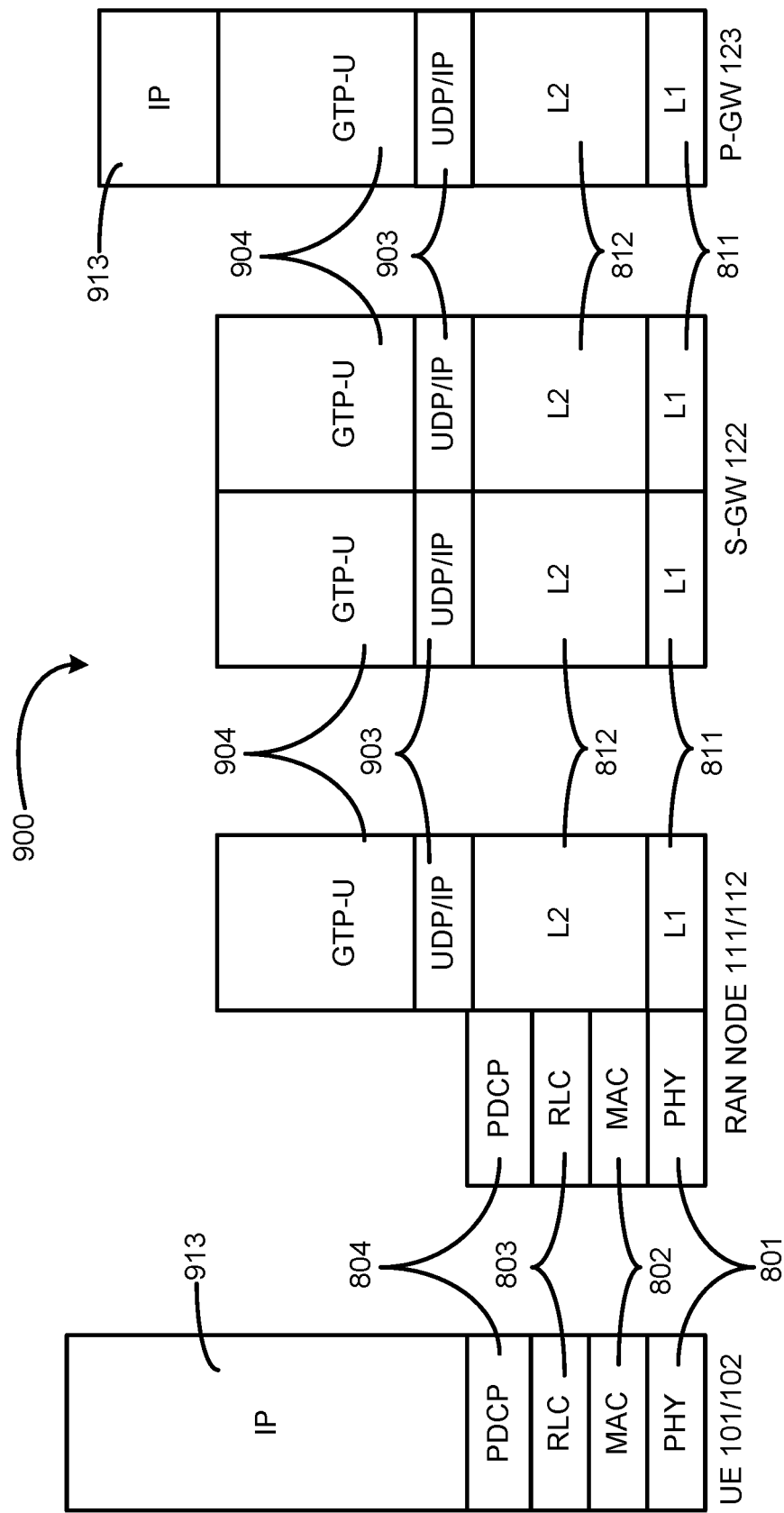
FIG. 9 is an illustration of a user plane protocol stack in accordance with various embodiments.

FIG. 9 is an illustration of a user plane protocol stack in accordance with some embodiments. In this embodiment, a user plane 900 is shown as a communications protocol stack between the UE 101 (or alternatively, the UE 102), the RAN node 111 (or alternatively, the RAN node 112), the S-GW 122, and the P-GW 123. The user plane 900 may utilize at least some of the same protocol layers as the control plane 800. For example, the UE 101 and the RAN node 111 may utilize a Uu interface (for example, an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 903 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 811, the L2 layer 812, the UDP/IP layer 903, and the GTP-U layer 904. The S-GW 122 and the P-GW 123 may utilize an S5/S8a interface to exchange user plane data via a protocol stack comprising the L1 layer 811, the L2 layer 812, the UDP/IP layer 903, and the GTP-U layer 904. As discussed above with respect to FIG. 8, NAS protocols support the mobility of the UE 101 and the session management procedures to establish and maintain IP connectivity between the UE 101 and the P-GW 123.

FIGS. 10-13 illustrate processes 1000-1300, respectively, for providing an updated UE Radio Capability or indicating a UE's usage setting according to various embodiments. For illustrative purposes, the operations of processes 1000-1300 are described as being performed by the various devices discussed with regard to FIGS. 1-7. Some of the processes 1000-1300 may include communications between various devices, and it should be understood that such communications may be facilitated by the various circuitry as described with regard to FIGS. 1-7 using the various messages/frames, protocols, entities, layers, etc. discussed with regard to FIGS. 8-9. Moreover, while particular examples and orders of operations are illustrated in FIGS. 10-13, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 10:
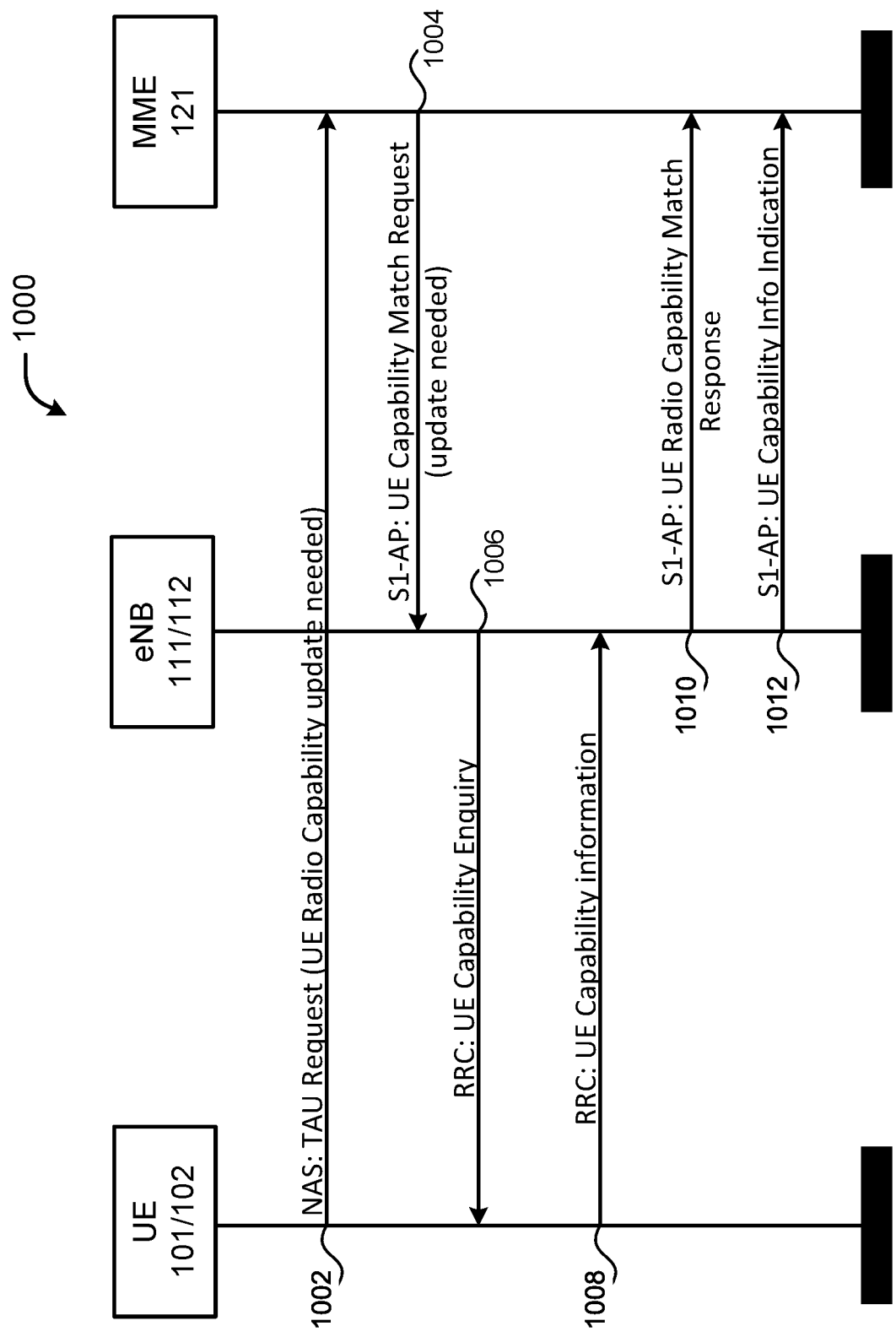
FIG. 10 shows an example user equipment (UE) Radio Capability Match Request procedure in accordance with various embodiments.

FIG. 10 shows an example UE Radio Capability Match Request procedure 1000 in accordance with various embodiments. Procedure 1000 may be performed in LTE and/or EPS systems (see for example, FIG. 1) when the MME 121 requires more information on the UE radio capabilities support to be able to set IMS voice over PS Session Supported Indication. Procedure 1000 may be used during an Initial Attach procedure, during a TAU procedure for the "first TAU following GERAN/UTRAN Attach," for "UE radio capability update," or when the MME 121 has not received the Voice Support Match Indicator (as part of the MM Context).

Procedure 1000 may begin at operation 1002 where the UE 101, 102 transmits an a NAS TAU Request message to the MME 121, where the TAU Request message includes a "UE radio capability information update needed" indication/indicator.

At operation 1004, the MME 121 may send an S1-AP UE Radio Capability Match Request message to the RAN node 111, 112. Typically, the MME 121 may indicate whether the MME 121 wants to receive a Voice support match indicator, and the MME 121 may include the UE Radio Capability information (IE) that it has previously received from the RAN node 111, 112 via a S1-AP UE CAPABILITY INFO INDICATION. According to various embodiments, the MME 121 may send the S1-AP UE Radio Capability Match Request message without the UE Radio Capability information (IE) that it has previously received from the RAN node 111, 112 via a S1-AP UE CAPABILITY INFO INDICATION, and instead the MME 121 may include an "update needed" indication/indicator in the S1-AP UE Radio Capability Match Request message.

Upon receiving the UE Radio Capability Match Request from the MME 121 at operation 1004, and if the RAN node 111, 112 has not already received the UE radio capabilities from the UE 101, 102 or from MME 121 in operation 1004, at operation 1006 the RAN node 111, 112 sends an RRC UE Capability Enquiry message to the UE 101, 102 to request the UE 101, 102 to upload the UE radio capability information. In various embodiments, when receiving the S1 interface UE RADIO CAPABILITY MATCH REQUEST message at operation 1004 with the "update needed" indicator, the RAN node 111, 112 may initiate the RRC UE Capability Enquiry procedure to retrieve the UE radio capability from the UE 101, 102 (operations 1006 and 1008), even when the RAN node 111, 112 has already received a UE radio capability IE from the MME 121 with an earlier S1 interface INITIAL CONTEXT SETUP REQUEST or UE RADIO CAPABILITY MATCH REQUEST message, or when the RAN node 111, 112 has already received the UE radio capability information from the UE 101, 102 with an earlier RRC UE Capability Enquiry procedure.

At operation 1008, the UE 101, 102 may provide the RAN node 111, 112 with its UE radio capabilities by generating and transmitting an RRC message with the UE Radio Capabilities Information to the RAN node 111, 112. In embodiments, the UE radio capabilities may include an indication about a current value of a CE mode B support indication ("Data Centric" or "Voice Centric") and/or a change in the UE's usage setting implemented by the UE 101, 102. For example, if the current value of the UE's usage setting is "voice centric" the UE radio capabilities may include a CE mode B support indication indicating a value of "not supported", or if the current value of the UE's usage setting is "data centric" the UE radio capabilities may include a CE mode B support indication indicating a value of "supported". The value of the CE mode B support indication may be based on the current UE's usage setting of the UE 101, 102.

At operation 1010, the RAN node 111, 112 may send an S1-AP UE Radio Capability Match Response to the MME 121. Typically, at operation 1010 the RAN node 111, 112 checks whether the UE radio capabilities are compatible with the network configuration for ensuring voice service continuity of voice calls initiated in IMS. For determining the appropriate UE Radio Capability Match Response, the RAN node 111, 112 is configured by the operator to check whether the UE supports certain capabilities required for Voice continuity of voice calls using IMS PS. In a shared network, the RAN node 111, 112 keeps a configuration separately per PLMN. The network configuration may indicate particular checks to perform, and may include checking, inter alia, the Radio capabilities for UTRAN/E-UTRAN FDD and/or TDD and/or the support of UTRAN/E-UTRAN frequency bands. The RAN node 111, 112 provides a Voice Support Match Indicator to the MME 121 to indicate whether the UE capabilities and networks configuration are compatible for ensuring voice service continuity of voice calls initiated in IMS. Additionally, the MME 121 may store the received Voice Support Match Indicator in the MM Context and may use it as an input for setting the IMS voice over PS Session Supported Indication. In some embodiments, operation 1010 may be not relevant for updating the UE's usage setting, and thus, the MME 121 may perform operation 1010 per current specifications.

At operation 1012, if the RAN node 111, 112 requested radio capabilities from the UE 101, 102 at operations 1006 and 1008, the RAN node 111, 112 may also send the UE radio capabilities to the MME 121 using the S1-AP UE CAPABILITY INFO INDICATION. The MME 121 may store the UE radio capabilities for subsequent accesses by the UE 101, 102. The MME 121 may store the UE radio capabilities without interpreting them for further provision to the RAN node 111, 112. In embodiments, the UE radio capabilities may include the CE mode B support indication, which specifies whether the UE 101, 102 is supporting operation in CE mode B or not; the value of the CE mode B support indication may be based on the current UE's usage setting. Operations 1010 and 1012 may be received by the MME 121 in any order.

Figure 11:
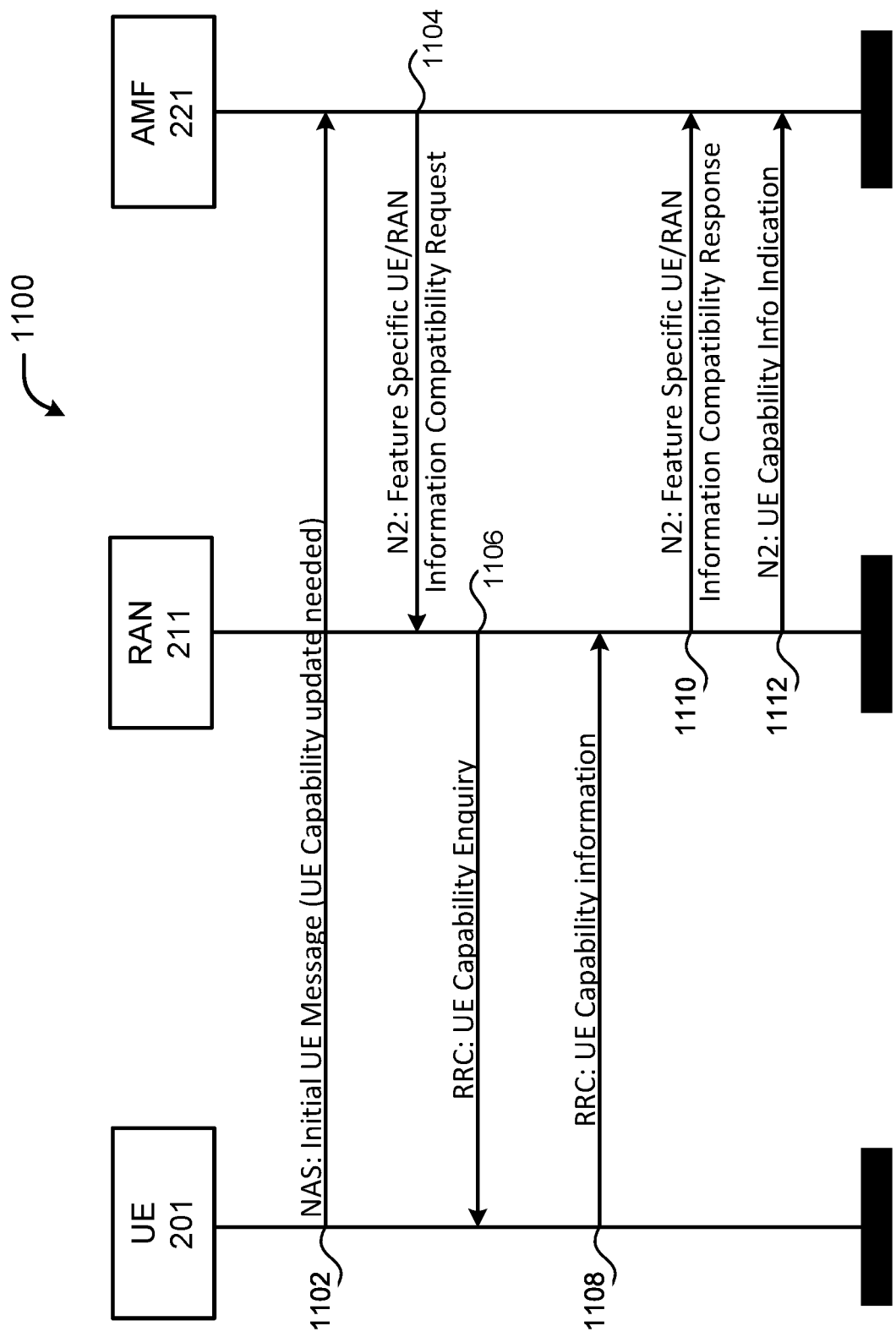
FIG. 11 shows an example feature specific UE/Radio Access Network (RAN) Radio information and Compatibility Request procedure in accordance with various embodiments.

FIG. 11 shows an example feature specific UE/RAN Radio information and Compatibility Request procedure 1100 in accordance with various embodiments. Process 1100 may be performed in NR systems (see for example, FIG. 2) when the AMF 221 requires specific information on the UE radio capabilities support, and/or support for a specific feature or compatibility with the next generation (NG)-RAN or RAN node 211. Procedure 1100 is typically used during a registration procedure, and in various embodiments procedure 1100 may be performed during a registration with AMF re-allocation procedure, a UE-triggered or network-triggered service request procedure, a handover procedure, or some other suitable procedure. In embodiments where 5GS to EPS interworking takes place, procedure 1100 may be performed during a registration procedure for the "first mobility registration update following GERAN/UTRAN Attach," for the "first TAU following EPS Attach," for a "UE radio capability update" or "UE 5GC Capability update," or when the AMF 221 has not received the Voice Support Match Indicator (as part of the MM Context) from the NG-RAN node 211. Such embodiments may be based on an LTE-NR interworking Process 1100 may begin at operation 1102 where the UE 201 may send an Initial message over the N1 interface. The Initial NAS message may include a "UE capability information update needed" indication/indicator, which may be a "UE radio capability information update needed" indicator or a "UE 5GC capability information update needed" indicator. In some embodiments, the UE 201 may send a Registration request message with the UE radio capability information update needed indicator.

At operation 1104, the AMF 221 may send an N2 Feature Specific UE/RAN Radio information and Compatibility Request message to the NG-RAN node 211. The AMF 221 generates the Feature Specific UE/RAN Radio information and Compatibility Request message to indicate whether the AMF 221 requires RAN related information for specific feature(s). Typically, the AMF 221 may include the UE (radio/5GC) capability information that is already stored and which was not already been provided to the RAN node 221. According to various embodiments, the AMF 221 may send the Feature Specific UE/RAN Radio information and Compatibility Request message without the UE Radio Capability information (IE) that it has previously received from the RAN node 211 via an N2 UE Capability Info Indication message. Instead, at operation 1104 the AMF 221 may include an "update needed" indication/indicator in the Feature Specific UE/RAN Radio information and Compatibility Request message to request the current UE's usage setting from the UE 201 or RAN 211, or request the CE mode B Restriction parameter from the UE 201 or RAN 211.

Upon receiving the Feature Specific UE/RAN information and compatibility request message at operation 1104, and if the RAN node 211 has not already received the UE radio capabilities from the UE 201 or from AMF 221 at operation 1104, at operation 1106 the RAN node 211 may send a request to the UE 201 to upload the UE radio capability information. In various embodiments, when receiving the N2 Feature Specific UE/RAN Radio information and Compatibility Request message at operation 1104 with the "update needed" indicator, the RAN node 211 may initiate the RRC UE Capability Enquiry procedure to retrieve the UE radio capability from the UE 201 (operations 1106 and 1108), even when the RAN node 211 has already received a UE radio capability IE from the AMF 221 with an earlier N2 interface message (for example, an N2 Initial Context Setup message), or when the RAN node 211 has already received the UE radio capability information from the UE 201 with an earlier RRC UE Capability Enquiry procedure.

At operation 1108, the UE 201 may provide the RAN node 211 with its UE radio capabilities by generating and transmitting an RRC message with the UE Radio Capabilities Information to the RAN node 211. In embodiments, the UE radio capabilities may include an indication about a current value of a CE mode B support indication. For example, if the current value of the UE's usage setting is "voice centric" the UE radio capabilities may include a CE mode B support indication indicating a value of "not supported", or if the current value of the UE's usage setting is "data centric" the UE radio capabilities may include a CE mode B support indication indicating a value of "supported". The value of the CE mode B support indication may be based on the current UE's usage setting.

At operation 1110, the RAN node 211 may send an N2 Feature Specific UE/RAN Information and Compatibility Response message to the AMF 221. Typically, the RAN node 211 may check whether the UE radio capabilities are compatible with the network configuration for the requested feature(s) and determines if additional parameter(s) need to be provided to the AMF 211. Additionally, the RAN node 211 may generate the Feature Specific UE/RAN information and compatibility request message to include a list of compatible feature(s) and/or the list of needed additional parameter(s). Moreover, the AMF 221 may store the information included in the Feature Specific UE/RAN Information and Compatibility Response (for example, in the MM context and/or RM context of the UE 201), and may use this information as an input for enabling specific features and/or for subsequent accesses by the UE 201. In some embodiments, operation 1110 may be not relevant for updating the UE's usage setting, and thus, the AMF 221 may perform operation 1110 per current specifications.

At operation 1112, If the RAN node 211 had requested radio capabilities from the UE 201 at operations 1106 and 1108, the RAN node 211 may send an N2 UE Capability Info Indication message including the UE radio capabilities to the AMF 221. The AMF 221 may store the UE radio capabilities without interpreting them for further provision to the RAN node 211. In embodiments, the UE radio capabilities may include the CE mode B support indication, which specifies whether the UE 201 is supporting operation in CE mode B or not; the value of the CE mode B support indication may be based on the current UE's usage setting. Operations 1110 and 1112 may be received by the AMF 221 in any order.

Figure 12:
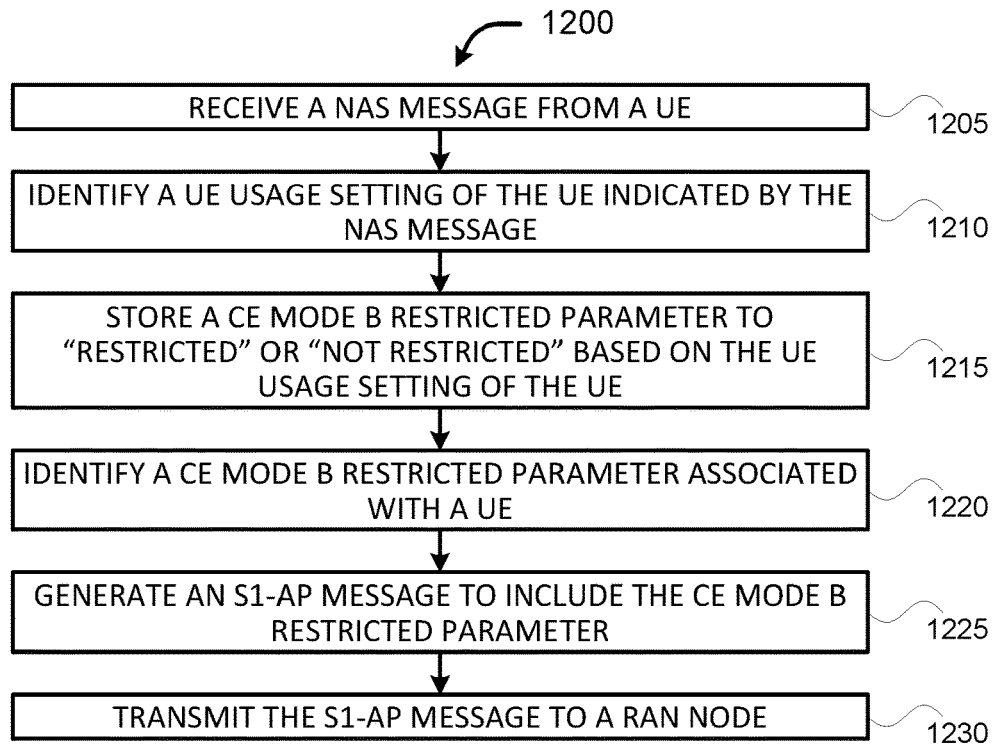
FIG. 12 shows an example mobility management entity procedure for updating a UE's usage setting in accordance with various embodiments.

FIG. 12 shows process 1200 for updating a UE's usage setting and CE mode B Restricted parameter in accordance with various embodiments. By way of example, process 1200 is discussed as being performed by an MME 121, and with respect to UE 101 and RAN node 111; however, other similar devices/entities may also perform process 1200. Process 1200 may begin at operation 1205 where network controller circuitry of the MME 121 may receive a NAS message from a UE 101. In various embodiments, the NAS message may be an Attach Request message, a TAU Request message, or a RAU Request message. For NR embodiments, an N1 version of any of the aforementioned messages may be used, for example, a Registration Request message for initial registration, mobility registration update or periodic registration update, a UE configuration update complete message, or NAS service request message, may be used.

At operation 1210, processor circuitry of the MME 121 may identify a UE's usage setting of the UE 101 indicated by the NAS message obtained at operation 1205. At operation 1215, the processor circuitry of the MME 121 may control storage of a CE mode B Restricted parameter with a "restricted" value or a "not restricted" value. In embodiments, the MME 121 may store the CE mode B Restriction parameter in a MM Context of the UE 101 or the processor circuitry of the MME 121 may derive its value, when needed, from the UE's usage setting parameter already stored in the UE context.

At operation 1220, the processor circuitry of the MME 121 may identify a CE mode B Restricted parameter associated with a UE 101. In some embodiments, operation 1220 may be performed in response to receipt of a NAS message, such as an Attach Request message, a TAU Request message, or the like obtained at operation 1205, or another NAS message obtain after operation 1205. At operation 1225, the processor circuitry of the MME 121 may generate an S1-AP message to include a stored CE mode B Restricted parameter. In embodiments, the S1-AP message may be any one of an INITIAL CONTEXT SETUP REQUEST message, a HANDOVER REQUEST message, a PATH SWITCH REQUEST ACKNOWLEDGE message, a CONNECTION ESTABLISHMENT INDICATION message, UE RADIO CAPABILITY MATCH REQUEST message, and a DOWNLINK NAS TRANSPORT message carrying a TAU ACCEPT message. For NR embodiments, an N2 version of any of the aforementioned messages may be used, and/or NR-specific messages may be used, such as an N2 Registration Accept message, N2 AMF Mobility Request message, an N2 path switch request acknowledgement message, a Response to Namf_Communication_UEContextTransfer message, and/or the like. At operation 1230, the network controller circuitry of the MME 121 may transmit the S1-AP message to the RAN node 111.

In first embodiments, the NAS message obtained at operation 1205 may be an Attach Request message that is sent after the UE 101 has detached from the network, where the UE 101 has changed the UE's usage setting from "voice centric" to "data centric" or vice versa. In these embodiments, the NAS message may include an indication of the UE's usage setting. In some embodiments, the RRC signaling sent by the UE during the attach procedure may include a UE radio capability of the UE 101, and the UE radio capability may include a CE mode B support indicator to indicate whether the UE is supporting operation in CE mode B or not. The MME 121 may obtain the UE radio capability including this parameter from the RAN node 111 any time during or after process 1200 and store it. In other embodiments, the NAS message at operation UE radio capability may only indicate the applicable UE's usage setting (for example, "voice centric" or "data centric"), which may be identified by the processor circuitry of the MME 121 at operation 1210; the processor circuitry of the MME 121 may then set the CE mode B Restricted parameter accordingly at operation 1215. In the first embodiments, the S1-AP message generated and transmitted at operations 1225 and 1230, respectively, may be an INITIAL CONTEXT SETUP REQUEST message.

In second embodiments, the NAS message obtained at operation 1205 may be an Attach Request message or a TAU Request message that is sent during an Attach procedure or a TAU procedure for a "first TAU following GERAN/UTRAN Attach," for a "UE radio capability update," or for indicating a change in the UE's usage setting from voice centric to data centric (and vice versa) if the UE supports CE Mode B. If the UE 101 changes its UE's usage setting while in EMM-Idle mode, then the NAS message obtained at operation 1205 may include the current UE's usage setting of the UE 101, and operations 1210 and 1215 may be performed in the order shown by FIG. 12.

If the UE 101 is in EMM-Connected when the UE's usage setting is changed, then the NAS message may or may not include a current UE's usage setting of the UE 101. In this case, at operation 1225 the processor circuitry of the MME 121 may generate an S1 interface INITIAL CONTEXT SETUP REQUEST or a UE RADIO CAPABILITY MATCH REQUEST message without including the UE radio capability IE, and at operation 1230 the network controller circuitry of the MME 121 may send such an S1-AP message to the RAN node 111 to trigger the RAN node 111 to retrieve the UE radio capability from the UE 101. The MME 121 may then obtain the updated UE radio capability from the RAN node 111.

In NR implementations of the second embodiments, the NAS message obtained at operation 1205 may be a Registration Request message for an initial registration (for example, when the UE 201 is in the RM-DEREGISTERED state) or for a mobility registration update (for example, the UE 201 is in RM-REGISTERED state and initiates a Registration procedure due to mobility), a periodic registration update (for example, the UE 201 is in RM-REGISTERED state and initiates a Registration procedure due to the Periodic Registration Update timer expiry) or for an emergency registration update (for example, the UE 201 is in a limited service state and needs to establish an emergency communication). In this case, at operation 1225 the processor circuitry of the AMF 221 may generate an N2 interface INITIAL CONTEXT SETUP REQUEST or an N2 Feature Specific UE/RAN Radio information and Compatibility Request message without including the UE radio capability IE, and at operation 1230 the network controller circuitry of the AMF 221 may send such an N2 message to the RAN node 211 to trigger the RAN node 211 to retrieve the UE radio capability from the UE 201. The AMF 221 may then obtain the updated UE radio capability from the RAN node 211.

In a variant of the second embodiments, the NAS message may be a TAU Request message including a "UE radio capability information update needed" indicator. In this case, at operation 1225 the processor circuitry of the MME 121 may generate an S1 interface INITIAL CONTEXT SETUP REQUEST or a UE RADIO CAPABILITY MATCH REQUEST message without including the UE radio capability IE, but instead includes an "update needed" indicator. At operation 1230 the network controller circuitry of the MME 121 may send such an S1-AP message to the RAN node 111 to trigger the RAN node 111 to perform a UE Capability Enquiry procedure with the UE 101 to obtain the UE radio capability from the UE 101. The MME 121 may then obtain the updated UE radio capability from the RAN node 111. In NR implementations of the second embodiments variation, the NAS message may be a Registration Request message, for example, for a mobility registration update, that includes the "UE radio capability information update needed" indicator.

In third embodiments, the NAS message may be an Attach Request message or a TAU Request message that includes a "Voice domain preference and UE's usage setting" IE. The purpose of the "Voice domain preference and UE's usage setting" IE is to signal to the network the UE's usage setting and voice domain preference for E-UTRAN. The UE's usage setting indicates whether the UE behaves in a voice centric or data centric way. The "Voice domain preference and UE's usage setting" IE may be in a format as shown by table 1.

TABLE 1 format for Voice domain preference and UE's usage setting IE

| 8 | 7 | 6 | 5 | 4 | 3 | 2 | 1 | |
|---|---|---|---|---|---|---|---|---|
| Voice domain preference and UE's usage setting IEI | | | | | | | | octet 1 |
| Length of Voice domain preference and UE's usage setting contents | | | | | | | | octet 2 |
| 0 Spare | 0 Spare | 0 Spare | 0 Spare | 0 Spare | UE's usage setting | Voice domain preference for E-UTRAN | | octet 3 |

The voice domain preference may be located at octet 3, bits 1 to 2 and the UE's usage setting may be located at octet 3, bit 3 in the Voice domain preference and UE's usage setting IE of table 1. The voice domain preference field (bits 1 and 2) may include a value of "00" to indicate a "CS Voice only" voice domain preference, a value of "01" to indicate a "IMS PS Voice only" voice domain preference, a value of "10" to indicate a "CS voice preferred, IMS voice as secondary" voice domain preference, or a value of "11" to indicate a "IMS PS voice preferred, CS Voice as secondary" voice domain preference. The UE's usage setting field (bit 3) may have a value of "0" to indicate a "voice centric" usage setting or a value of "1" to indicate a "data centric" usage setting. For NR implementations, a "UE's usage setting" IE may be used, which may include the same or similar values to indicate the voice centric or data centric usage setting.

In the third embodiments, the CE mode B capability may be included or indicated in the RRC signaling during the attach or TAU procedure regardless of the currently enabled UE's usage setting (for example, "Voice Centric" or "Data Centric"). For example, if the UE 101 has a CE mode B capability indicating a value of "CE mode B supported", then the UE's usage setting indicator (bit 3 of the Voice domain preference and UE's usage setting IE or a bit of the UE's usage setting IE) may be set to "0" to indicate that the UE 101 is "voice centric," or it may be set to "1" to indicate that the UE 101 is "data centric."

In the third embodiments, if the UE 101 supports "CE mode B" and the UE's usage setting is set to "Voice Centric," then at operation 1215 the processor circuitry of the MME 121 may set the CE mode B Restriction parameter of the UE 101 to a "restricted" value (for example, "1"). If the UE 101 supports "CE mode B" and the UE's usage setting is set to "Data Centric," then at operation 1215 the processor circuitry of the MME 121 may set the CE mode B Restriction parameter of the UE 101 to a "not restricted" value (for example, "0"). In various embodiments, the processor circuitry of the MME 121 may store the CE mode B Restriction parameter in the MM Context associated with the UE 101. In other embodiments, the processor circuitry of the MME 121 may derive the value for the CE mode B Restriction parameter, when needed, from the UE's usage setting parameter already stored in the UE context. In NR implementations of the third embodiments, the processor circuity of the AMF 221 may set the CE mode B Restriction parameter associated with the UE 201 (or derive its value) in a same or similar manner as discussed previously.

In fourth embodiments, the NAS message obtained at operation 1205 may be an Attach/TAU Request message, and during the attach or TAU procedure the RRC signaling sent by the UE may include two versions of the UE radio capability, a first version for the voice centric usage setting and a second version for the data centric usage setting. Both versions may be stored by the MME 121 at operation 1215, and at operation 1225 the processor circuitry of the MME 121 may select the correct version to be included in the S1-AP message based on the current UE's usage setting of the UE 101. If the UE 101 is in EMM-CONNECTED mode and supports CE mode B, and if the UE's usage setting has changed, the MME 121 may send the appropriate version of the UE Radio Capability to the E-UTRAN 111, 112 in a Connection Establishment Indication message, Downlink NAS Transport message, or the like at operation 1230. NR implementations of the fourth embodiments may operate in a similar manner using NR-specific messages.

In fifth embodiments, the processor circuitry of the MME 121 may identify the UE's usage setting at operation 1210 and/or may identify the UE radio capability information at operation 1220. Whenever the UE's usage setting is changed from "Voice Centric" to "Data Centric" (and vice versa), the processor circuitry of the MME 121 may modify the UE radio capability information at operation 1220 or 1225 to obtain updated UE radio capability, which may be sent to the RAN node 111, 112 at operation 1230.

Figure 13:
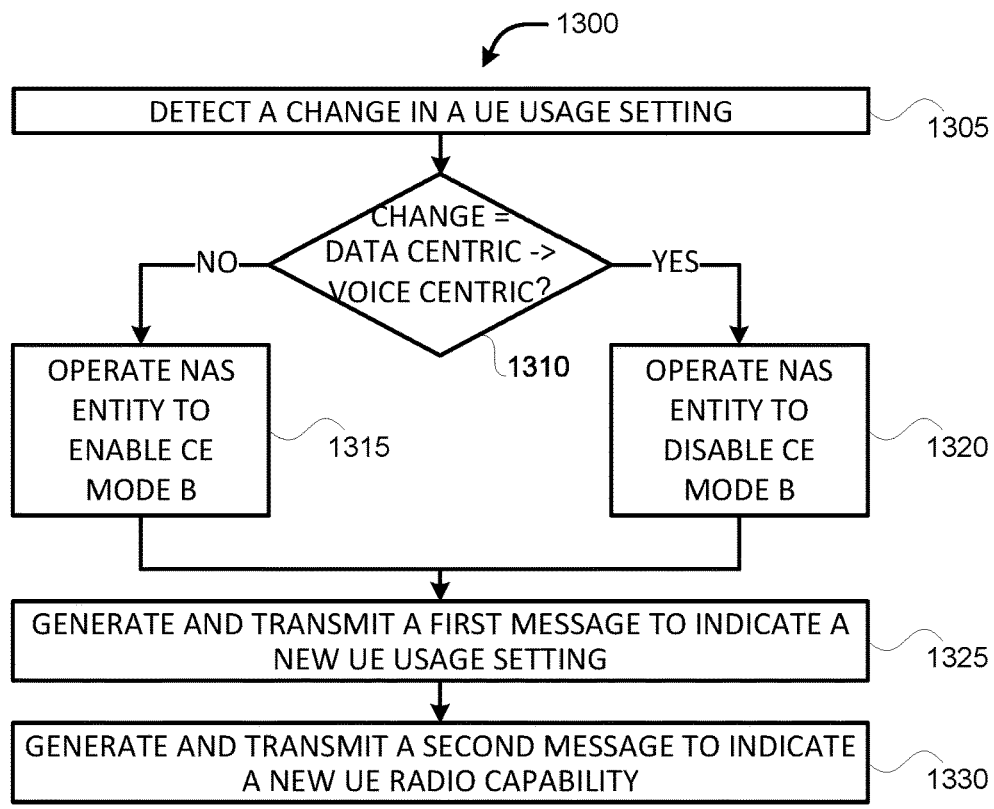
FIG. 13 shows an example UE procedure for updating a UE's usage setting in accordance with various embodiments.

FIG. 13 shows an example process 1300 for updating a UE's usage setting in accordance with various embodiments. By way of example, process 1300 is discussed as being performed by an UE 101, and with respect to MME 121 and RAN node 111; however, other similar devices/entities may also perform process 1300. Process 1300 may begin at operation 1305 where the processor circuitry of the UE 101 may detect a change in a usage setting.

At operation 1310, the processor circuitry of the UE 101 may determine whether the change of the UE's usage setting is from a data centric usage setting to a voice centric usage setting. If at operation 1310 the processor circuitry determines that the UE's usage setting has been changed from a data centric usage setting to a voice centric usage setting, then the processor circuitry may proceed to operation 1320 to operate a NAS entity and an AS entity to disable CE mode B capabilities, to not extend any NAS timers, initiate any dedicated bearer establishment procedures, initiate reselection procedures (if voice services are not available), etc. If at operation 1310 the processor circuitry determines that the UE's usage setting has not been changed from the data centric usage setting to the voice centric usage setting (for example, the change was from the voice centric usage setting to the data centric usage setting), then the processor circuitry may proceed to operation 1315 to operate a NAS entity and an AS entity to enable CE mode B capabilities, extend NAS timers (if necessary), initiate dedicated bearer establishment procedures (if necessary), maintain a current connection, etc. At operation 1325, the processor circuitry of the UE 101 may generate a first message to indicate the new UE's usage setting, and operate the radio control circuitry (for example, RF circuitry 506 of the RFEM 415) to transmit the message. At operation 1330, the processor circuitry of the UE 101 may generate a second message to indicate the new UE radio capability of the UE 101, and operate the radio control circuitry (for example, RF circuitry 506 of the RFEM 415) to transmit the message. Operation 1330 may be omitted in some embodiments. For example, the second message may be generated and sent when the UE 101 performs an attach procedure, but the UE 101 may not generate the second message during a TAU procedure.

In first embodiments, the first message generated and sent at operation 1325 may be an Attach Request message that is sent after the UE 101 has detached from the network, which may include the applicable UE's usage setting (for example, "voice centric" or "data centric"). The second message generated and sent at operation 1330 may be a message that includes a UE radio capability of the UE 101, and the UE radio capability of the UE 101 may indicate the UE's usage setting. In some embodiments, the RRC signaling sent by the UE during the attach procedure may include a UE radio capability of the UE 101, and the UE radio capability may include a CE mode B support indicator to indicate whether the UE is supporting operation in CE mode B or not.

In second embodiments, the message generated and sent at operation 1325 may be an Attach Request message or a TAU Request message that is sent during an Attach procedure or a TAU procedure for a "first TAU following GERAN/UTRAN Attach," for a "UE radio capability update," or for indicating a change in the UE's usage setting from voice centric to data centric (and vice versa) if the UE supports CE Mode B. If the UE 101 changes its usage setting at operation 1305 while in EMM-IDLE mode, then the NAS message may include the current UE's usage setting of the UE. If the UE 101 is in EMM-CONNECTED mode when the UE's usage setting is changed, then the NAS message at operation 1325 may or may not include a current UE's usage setting of the UE 101, and a second message that is generated and sent at operation 1330 may be an RRC UE Capability Information message that is sent in response to receipt of an RRC UE Capability Enquiry message from the RAN node 111. In NR implementations of the second embodiments, the message generated and sent at operation 1325 may be a Registration Request message for an initial registration (for example, when the UE 201 is in the RM-DEREGISTERED state) or for a mobility registration update (for example, the UE 201 is in RM-REGISTERED state and initiates a Registration procedure due to mobility), a periodic registration update (for example, the UE 201 is in RM-REGISTERED state and initiates a Registration procedure due to the Periodic Registration Update timer expiry) or for an emergency registration update (for example, the UE 201 is in a limited service state and needs to establish an emergency communication).

In a variant of the second embodiments, the message generated and sent at operation 1325 may be a TAU Request message that includes a "UE radio capability information update needed" indicator. In NR implementations of the second embodiments variation, the message generated and sent at operation 1325 may be a Registration Request message (for example, for a mobility registration update), that includes the "UE radio capability information update needed" indicator.

In third embodiments, the message generated and sent at operation 1325 may be an Attach Request message or a TAU Request message that includes a "Voice domain preference and UE's usage setting" IE, where a UE's usage setting field (bit 3) of the "Voice domain preference and UE's usage setting" IE may have a value of "0" to indicate a "voice centric" usage setting or a value of "1" to indicate a "data centric" usage setting. For NR implementations, a "UE's usage setting" IE may be used, which may include the same or similar values to indicate the voice centric or data centric usage setting. In the third embodiments, operation 1330 may be omitted.

In fourth embodiments, the first message generated and sent at operation 1325 may be an Attach/TAU Request message and the second message generated and sent at operation 1330 may be an RRC UE Capability Information message that is sent in response to receipt of an RRC UE Capability Enquiry message from the RAN node 111 and includes two versions of the UE radio capability, a first version for the voice centric usage setting and a second version for the data centric usage setting. In the fourth embodiments, operation 1330 may be omitted.

In fifth embodiments, the message generated and sent at operation 1325 may be an Attach/TAU Request message that indicates the UE's usage setting (for example, in the "Voice domain preference and UE's usage setting" IE or "UE's usage setting" IE), where the MME 121/AMF 221 modifies the UE radio capability information based on whether the UE's usage setting is changed from "Voice Centric" to "Data Centric" (and vice versa). In the fifth embodiments, operation 1330 may be omitted.

Some non-limiting examples are provided infra. The following examples pertain to further embodiments. Specifics in the examples may be used anywhere in one or more embodiments discussed previously. All optional features of devices described herein may also be implemented with respect to one or more methods or processes, and vice versa.

Example 1 may include one or more computer-readable storage media, "CRSM", having instructions that, when executed by one or more processors of a Mobility Management Entity, "MME", are to cause the MME to: identify, from a mobility management, "MM", context, a coverage enhancement, "CE", mode B Restricted parameter associated with a user equipment, "UE", that is capable of operating in CE mode B, wherein the CE mode B Restricted parameter is set to one of a "restricted" value or a "non-restricted" value; and control transmission of the CE mode B Restricted parameter to an evolved NodeB, "eNB", via S1 signaling to indicate whether the UE is restricted or not restricted for use of CE mode B.

Example 2 may include the one or more CRSM of example 1 and/or some other examples herein, wherein, to control transmission of the CE mode B Restricted parameter via the S1 signaling, execution of the instructions is to cause the MME to: generate an S1 application protocol, "S1AP", message to include the CE mode B Restricted parameter.

Example 3 may include the one or more CRSM of example 2 and/or some other examples herein, wherein the S1AP message is one of an Initial Context Setup Request message, a Handover Request message, a Path Switch Request Acknowledge message, a Connection Establishment Indication message, or a Downlink Non-Access Stratum, "NAS", Transport message carrying a Tracking Area Update, "TAU", Accept message.

Example 4 may include the one or more CRSM of examples 1-3 and/or some other examples herein, wherein execution of the instructions by the one or more processors is to cause the MME to: control receipt of a NAS message from the UE; identify a UE's usage setting indicated by the NAS message; and control storage of the CE mode B Restricted parameter in the MM context to have a "restricted" value when the UE's usage setting is set to a voice centric usage setting, or control storage of the CE mode B Restricted parameter in the MM context to have a "not restricted" value when the UE's usage setting is set to a data centric usage setting.

Example 5 may include the one or more CRSM of example 4 and/or some other examples herein, wherein the NAS message is an Attach request or TAU request message.

Example 6 may include the one or more CRSM of example 5 and/or some other examples herein, wherein the Attach request message or the TAU request message is to include a Voice domain preference and UE's usage setting information element, and wherein the Voice domain preference and UE's usage setting information element is to indicate the UE's usage setting.

Example 7 may include the one or more CRSM of examples 1-6 and/or some other examples herein, wherein, when the CE mode B Restricted parameter stored in the MM context is set to the "not restricted" value, execution of the instructions by the one or more processors is to cause the MME to extend NAS timer settings for the UE.

Example 8. An apparatus to be employed as a Mobility Management Entity, "MME", the apparatus comprising: processor circuitry to: identify, from a mobility management, "MM", context, a UE's usage setting and UE Radio Capability information associated with a user equipment, "UE", that is capable of operating in coverage enhancement, "CE", mode B, wherein the UE Radio Capability information includes a of CE mode B support indication set to one of a "supported" value or a "not supported" value, and detect, from the UE's usage setting in Non-Access Stratum, "NAS", message, a change of the UE's usage setting from a data centric usage setting to a voice centric usage setting or from the voice centric usage setting to the data centric usage setting; and network controller circuitry communicatively coupled with the processor circuitry, the network controller circuitry to: receive the NAS message from the UE; and transmit an S1AP message to an evolved NodeB, "eNB", such that the eNB is triggered to request UE Radio Capability information from the UE.

Example 9 may include the apparatus of example 8 and/or some other examples herein, wherein the S1AP message is an Initial Context Setup Request message or a UE Radio Capability Match Request message during an Attach procedure or a Tracking Area Update, "TAU", procedure.

Example 10 may include the apparatus of example 9 and/or some other examples herein, wherein, when the UE has initiated the Attach procedure or the TAU procedure in an EPS Mobility Management, "EMM",-Idle mode, the processor circuitry is to: control deletion of any currently stored UE Radio Capability information of the UE; not send any UE Radio Capability information to the eNB in the Initial Context Setup Request message or the UE Radio Capability Match Request message such that the eNB is to be triggered to request UE Radio Capability information from the UE and to upload the requested UE Radio Capability to the MME in an S1 interface UE Capability Info Indication message; control the network controller circuitry to receive an S1 interface UE Capability Info Indication message from the eNB, wherein the S1 interface UE Capability Info Indication message is to include the UE Radio Capability information requested by the eNB; control storage of the UE Radio Capability information; and generate an Initial Context Setup Request message or a UE Radio Capability Match Request message to include the stored UE Radio Capability information in other cases than Attach procedure, Tracking Area Update procedure for the "first TAU following GERAN/UTRAN Attach" and "UE radio capability update" procedure.

Example 11 may include the apparatus of example 8 and/or some other examples herein, wherein, when the UE has initiated the TAU procedure in an EMM-Connected mode, the network controller circuitry is to: receive a TAU Request message from the UE via NAS signaling, wherein the TAU Request message is to indicate that a UE radio capability information update is needed or that the UE's usage setting changed from the data centric usage setting to the voice centric usage setting or from the voice centric usage setting to the data centric usage setting; transmit a UE Radio Capability Match Request message to the eNB via S1 signaling, wherein the UE Radio Capability Match Request message is to include an update needed indicator, wherein the update needed indicator is to trigger the eNB to send a UE Capability Enquiry message to the UE via radio resource control (RRC) signaling; and receive a UE Capability Info Indication message via the S1 signaling, wherein the UE Capability Info message is to include a UE Radio Capability information element, "IE", and wherein the UE Radio Capability IE is to include a CE mode B support indication, and wherein the processor circuitry is to control storage of information of the UE Radio Capability IE in association with an identifier of the UE for subsequent network accesses by the UE.

Example 12 may include one or more computer-readable storage media, "CRSM", having instructions that, when executed by one or more processors of a user equipment, "UE", that is capable of operating in coverage enhancement, "CE", mode B, is to cause the UE to: detect a change of a usage setting of the UE from a data centric usage setting to a voice centric usage setting or from the voice centric usage setting to the data centric usage setting; generate a Non-Access Stratum, "NAS", message to indicate the change of the usage setting; and control transmission of the NAS message to a mobility management entity.

Example 13 may include the one or more CRSM of example 12 and/or some other examples herein, wherein the NAS message is an Attach Request message or a Tracking Area Update, "TAU", Request message.

Example 14 may include the one or more CRSM of example 13 and/or some other examples herein, wherein, to generate the NAS message, execution of the instructions by the one or more processors is to cause the UE to: generate the Attach Request message or the TAU message to include a "Voice domain preference and UE's usage setting" information element, wherein the "Voice domain preference and UE's usage setting" information element is to indicate whether the UE is to behave according to the voice centric usage setting or according to the data centric usage setting.

Example 15 may include the one or more CRSM of example 14 and/or some other examples herein, wherein execution of the instructions is to cause the UE to: control receipt of a Radio Resource Control, "RRC", UE Capability Enquiry message from a Radio Access Network, "RAN", node; and generate, in response to receipt of the RRC UE Capability Enquiry message, an RRC UE Capability information message to include the UE Capability information.

Example 16 may include the one or more CRSM of examples 12-15 and/or some other examples herein, wherein execution of the instructions is to cause the UE to: control the setting of the CE mode B support indication in the UE Capability information to have a "not supported" value when the UE's usage setting is set to a voice centric usage setting, or control the setting of the CE mode B support indication in the UE Capability information to have a "supported" value when the usage setting is set to a data centric usage setting.

Example 17 may include the one or more CRSM of example 13 and/or some other examples herein, wherein the NAS message is to include a Voice domain preference and UE's usage setting information element, wherein the Voice domain preference and UE's usage setting information element is to indicate the change of the UE's usage setting.

Example 18 may include the one or more CRSM of examples 12-17 and/or some other examples herein, wherein execution of the instructions is to cause the UE to: not operate in the CE mode B when the usage setting of the UE is set to the voice centric usage setting.

Example 19 may include an apparatus to be employed as a Mobility Management Entity, "MME", the apparatus comprising: processing means for: identifying, from a mobility management, "MM", context, a coverage enhancement, "CE", mode B Restricted parameter associated with a user equipment, "UE", that is capable of operating in CE mode B, wherein the CE mode B Restricted parameter is set to one of a "restricted" value or a "non-restricted" value, and generating an S1 application protocol, "S1AP", message to include the CE mode B Restricted parameter; and communication means for transmitting the S1-AP message to an evolved NodeB, "eNB", via S1 signaling to indicate whether the UE is restricted or not restricted for use of CE mode B.

Example 20 may include the apparatus of example 19 and/or some other examples herein, wherein the S1AP message is one of an Initial Context Setup Request message, a Handover Request message, a Path Switch Request Acknowledge message, a Connection Establishment Indication message, or a Downlink Non-Access Stratum, "NAS", Transport message carrying a Tracking Area Update, "TAU", Accept message.

Example 21 may include the apparatus of example 19 or 20 and/or some other examples herein, wherein: the communication means is for receiving a NAS message from the UE; and the processing means is for: identifying a UE's usage setting indicated by the NAS message; and controlling storage of the CE mode B Restricted parameter in the MM context to have a "restricted" value when the UE's usage setting is set to a voice centric usage setting, or controlling storage of the CE mode B Restricted parameter in the MM context to have a "not restricted" value when the UE's usage setting is set to a data centric usage setting.

Example 22 may include the apparatus of example 21 and/or some other examples herein, wherein the NAS message is an Attach request or TAU request message.

Example 23 may include the apparatus of example 22 and/or some other examples herein, wherein the Attach request message or the TAU request message is to include a Voice domain preference and UE's usage setting information element, and wherein the Voice domain preference and UE's usage setting information element is to indicate the UE's usage setting.

Example 24 may include the apparatus of example 19 and/or some other examples herein, wherein the S1AP message is an Initial Context Setup Request message or a UE Radio Capability Match Request message during an Attach procedure or a TAU procedure.

Example 25 may include the apparatus of examples 19-24 and/or some other examples herein, wherein, when the CE mode B Restricted parameter stored in the MM context is set to "not restricted" value, the processing means is for extending NAS timer settings for the UE.

Example 26 may include a method to be performed by a Mobility Management Entity, "MME", the method comprising: identifying or causing to identify, from a mobility management, "MM", context, a coverage enhancement, "CE", mode B Restricted parameter associated with a user equipment, "UE", that is capable of operating in CE mode B, wherein the CE mode B Restricted parameter is set to one of a "restricted" value or a "non-restricted" value; and transmitting or causing to transmit the CE mode B Restricted parameter to an evolved NodeB, "eNB", via S1 signaling to indicate whether the UE is restricted or not restricted for use of CE mode B.

Example 27 may include the method of example 26 and/or some other examples herein, wherein transmitting the CE mode B Restricted parameter via the S1 signaling comprises: generating or causing to generate an S1 application protocol, "S1AP", message to include the CE mode B Restricted parameter.

Example 28 may include the method of example 27 and/or some other examples herein, wherein the S1AP message is one of an Initial Context Setup Request message, a Handover Request message, a Path Switch Request Acknowledge message, a Connection Establishment Indication message, or a Downlink Non-Access Stratum, "NAS", Transport message carrying a Tracking Area Update, "TAU", Accept message.

Example 29 may include the method of examples 26-28 and/or some other examples herein, further comprising: receiving or causing to receive a NAS message from the UE; identifying or causing to identify a UE's usage setting indicated by the NAS message; and storing or causing to store the CE mode B Restricted parameter in the MM context to have a "restricted" value when the UE's usage setting is set to a voice centric usage setting, or storing or causing to store the CE mode B Restricted parameter in the MM context to have a "not restricted" value when the UE's usage setting is set to a data centric usage setting.

Example 30 may include the method of example 29 and/or some other examples herein, wherein the NAS message is an Attach request or TAU request message.

Example 31 may include the method of example 30 and/or some other examples herein, wherein the Attach request message or the TAU request message is to include a Voice domain preference and UE's usage setting information element, and wherein the Voice domain preference and UE's usage setting information element is to indicate the UE's usage setting.

Example 32 may include the method of examples 26-31 and/or some other examples herein, wherein, when the CE mode B Restricted parameter stored in the MM context is set to the "not restricted" value, the method comprises extending or causing to extend NAS timer settings for the UE.

Example 33 may include a method to be performed by a Mobility Management Entity, "MME", the method comprising: identifying or causing to identify, from a mobility management, "MM", context, a UE's usage setting and UE Radio Capability information associated with a user equipment, "UE", that is capable of operating in coverage enhancement, "CE", mode B, wherein the UE Radio Capability information includes a of CE mode B support indication set to one of a "supported" value or a "not supported" value, and receiving or causing to receive a Non-Access Stratum, "NAS", message from the UE; detect, from the UE's usage setting in the NAS message, a change of the UE's usage setting from a data centric usage setting to a voice centric usage setting or from the voice centric usage setting to the data centric usage setting; and transmitting or causing to transmit an S1AP message to an evolved NodeB, "eNB", such that the eNB is triggered to request UE Radio Capability information from the UE.

Example 34 may include the method of example 33 and/or some other examples herein, wherein the S1AP message is an Initial Context Setup Request message or a UE Radio Capability Match Request message during an Attach procedure or a Tracking Area Update, "TAU", procedure.

Example 35 may include the method of example 34 and/or some other examples herein, wherein, when the UE has initiated the Attach procedure or the TAU procedure in an EPS Mobility Management, "EMM",-Idle mode, the method comprises: deleting or causing to delete any currently stored UE Radio Capability information of the UE; not sending or causing to not send any UE Radio Capability information to the eNB in the Initial Context Setup Request message or the UE Radio Capability Match Request message such that the eNB is to be triggered to request UE Radio Capability information from the UE and to upload the requested UE Radio Capability to the MME in an S1 interface UE Capability Info Indication message; receiving or causing to recieve an S1 interface UE Capability Info Indication message from the eNB, wherein the S1 interface UE Capability Info Indication message is to include the UE Radio Capability information requested by the eNB; storing or causing to store the UE Radio Capability information; and generating or causing to generate an Initial Context Setup Request message or a UE Radio Capability Match Request message to include the stored UE Radio Capability information in other cases than Attach procedure, Tracking Area Update procedure for the "first TAU following GERAN/UTRAN Attach" and "UE radio capability update" procedure.

Example 36 may include the method of example 33 and/or some other examples herein, wherein, when the UE has initiated the TAU procedure in an EMM-Connected mode, the method comprises: receiving or causing to receive a TAU Request message from the UE via NAS signaling, wherein the TAU Request message is to indicate that a UE radio capability information update is needed or that the UE's usage setting changed from the data centric usage setting to thevoice centric usage setting or from the voice centric usage setting to the data centric usage setting; transmitting or causing to transmit a UE Radio Capability Match Request message to the eNB via S1 signaling, wherein the UE Radio Capability Match Request message is to include an update needed indicator, wherein the update needed indicator is to trigger the eNB to send a UE Capability Enquiry message to the UE via radio resource control (RRC) signaling; receiving or causing to receive a UE Capability Info Indication message via the S1 signaling, wherein the UE Capability Info message is to include a UE Radio Capability information element, "IE", and wherein the UE Radio Capability IE is to include a CE mode B support indication; and storing or causing to store information of the UE Radio Capability IE in association with an identifier of the UE for subsequent network accesses by the UE.

Example 37 may include a method to be performed by a user equipment, "UE", that is capable of operating in coverage enhancement, "CE", mode B, the method comprising: detecting or causing to detect a change of a usage setting of the UE from a data centric usage setting to a voice centric usage setting or from the voice centric usage setting to the data centric usage setting; generating or causing to generate a Non-Access Stratum, "NAS", message to indicate the change of the usage setting; and transmitting or causing to transmit the NAS message to a mobility management entity.

Example 38 may include the method of example 37 and/or some other examples herein, wherein the NAS message is an Attach Request message or a Tracking Area Update, "TAU", Request message.

Example 39 may include the method of example 38 and/or some other examples herein, wherein generating the NAS message comprises: generating or causing to generate the Attach Request message or the TAU message to include a "Voice domain preference and UE's usage setting" information element, wherein the "Voice domain preference and UE's usage setting" information element is to indicate whether the UE is to behave according to the voice centric usage setting or according to the data centric usage setting.

Example 40 may include the method of example 39 and/or some other examples herein, further comprising: receiving or causing to receive a Radio Resource Control, "RRC", UE Capability Enquiry message from a Radio Access Network, "RAN", node; and generating or causing to generate, in response to receipt of the RRC UE Capability Enquiry message, an RRC UE Capability information message to include the UE Capability information.

Example 41 may include the method of examples 37-40 and/or some other examples herein, further comprising: setting or causing to set the CE mode B support indication in the UE Capability information to have a "not supported" value when the UE's usage setting is set to a voice centric usage setting, or setting or causing to set the CE mode B support indication in the UE Capability information to have a "supported" value when the usage setting is set to a data centric usage setting.

Example 42 may include the method of example 38 and/or some other examples herein, wherein the NAS message is to include a Voice domain preference and UE's usage setting information element, wherein the Voice domain preference and UE's usage setting information element is to indicate the change of the UE's usage setting.

Example 43 may include the method of examples 37-42 and/or some other examples herein, further comprising: not operating or causing to not operate in the CE mode B when the usage setting of the UE is set to the voice centric usage setting.

Example 44 may include a method to be performed by a Mobility Management Entity, "MME", the method comprising: identifying or causing to identify, from a mobility management, "MM", context, a coverage enhancement, "CE", mode B Restricted parameter associated with a user equipment, "UE", that is capable of operating in CE mode B, wherein the CE mode B Restricted parameter is set to one of a "restricted" value or a "non-restricted" value; generating or causing to generate an S1 application protocol, "S1AP", message to include the CE mode B Restricted parameter; and transmitting or causing to transmit the S1-AP message to an evolved NodeB, "eNB", via S1 signaling to indicate whether the UE is restricted or not restricted for use of CE mode B.

Example 45 may include the method of example 44 and/or some other examples herein, wherein the S1AP message is one of an Initial Context Setup Request message, a Handover Request message, a Path Switch Request Acknowledge message, a Connection Establishment Indication message, or a Downlink Non-Access Stratum, "NAS", Transport message carrying a Tracking Area Update, "TAU", Accept message.

Example 46 may include the method of example 44 or 45 and/or some other examples herein, further comprising: receiving or causing to receive a NAS message from the UE; identifying or causing to identify a UE's usage setting indicated by the NAS message; and storing or causing to store the CE mode B Restricted parameter in the MM context to have a "restricted" value when the UE's usage setting is set to a voice centric usage setting, or storing or causing to store the CE mode B Restricted parameter in the MM context to have a "not restricted" value when the UE's usage setting is set to a data centric usage setting.

Example 47 may include the method of example 46 and/or some other examples herein, wherein the NAS message is an Attach request or TAU request message.

Example 48 may include the method of example 47 and/or some other examples herein, wherein the Attach request message or the TAU request message is to include a Voice domain preference and UE's usage setting information element, and wherein the Voice domain preference and UE's usage setting information element is to indicate the UE's usage setting.

Example 49 may include the method of example 44 and/or some other examples herein, wherein the S1AP message is an Initial Context Setup Request message or a UE Radio Capability Match Request message during an Attach procedure or a TAU procedure.

Example 50 may include the method of examples 44-49 and/or some other examples herein, wherein, when the CE mode B Restricted parameter stored in the MM context is set to "not restricted" value, the method comprises extending NAS timer settings for the UE.

Example 51 may include an apparatus comprising means to perform one or more elements of a method described in or related to any of examples 1-50, or any other method or process described herein. Example 52 may include one or more non-transitory computer-readable media comprising instructions to cause an electronic device, upon execution of the instructions by one or more processors of the electronic device, to perform one or more elements of a method described in or related to any of examples 1-50, or any other method or process described herein. Example 53 may include an apparatus comprising logic, modules, or circuitry to perform one or more elements of a method described in or related to any of examples 1-50, or any other method or process described herein. Example 54 may include a method, technique, or process as described in or related to any of examples 1-50, or portions or parts thereof. Example 55 may include an apparatus comprising: one or more processors and one or more computer readable media comprising instructions that, when executed by the one or more processors, cause the one or more processors to perform the method, techniques, or process as described in or related to any of examples 1-50, or portions thereof. Example 56 may include a signal as described in or related to any of examples 1-50, or portions or parts thereof. Example 57 may include a signal in a wireless network as shown and described herein. Example 58 may include a method of communicating in a wireless network as shown and described herein. Example 59 may include a system for providing wireless communication as shown and described herein. Example 60 may include a device for providing wireless communication as shown and described herein.

The foregoing description of the above examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the embodiments discussed herein.

The invention claimed is:

1. One or more non-transitory computer-readable storage media (NTCRSM) comprising instructions that, when executed by one or more processors of a Mobility Management Entity (MME), cause the MME to:

receive a Non-Access Stratum (NAS) message from a user equipment (UE) that is capable of operating in coverage enhancement (CE) mode B;

determine a usage setting of the UE that is indicated by the NAS message, the usage setting set to one of a voice centric usage setting or a data centric usage setting;

upon a determination that the usage setting of the UE is set to a voice centric usage setting, set a CE mode B Restricted parameter in a mobility management (MM) context associated with the UE to have a "restricted" value;

upon a determination that the usage setting of the UE is set to a data centric usage setting, set the CE mode B Restricted parameter in the MM context associated with the UE to have a "not restricted" value; and control transmission of the CE mode B Restricted parameter to a base station via S1 signaling to indicate whether the UE is restricted or not restricted for use of CE mode B.

2. The one or more NTCRSM of claim 1, wherein, to control transmission of the CE mode B Restricted parameter via the S1 signaling, execution of the instructions is to cause the MME to:

generate an S1 application protocol (S1AP) message to include the CE mode B Restricted parameter.

3. The one or more NTCRSM of claim 2, wherein the S1AP message is one of an Initial Context Setup Request message, a Handover Request message, a Path Switch Request Acknowledge message, a Connection Establishment Indication message, or a Downlink Non-Access Stratum (NAS) Transport message carrying a Tracking Area Update (TAU) Accept message.

4. The one or more NTCRSM of claim 1, wherein the NAS message is an Attach request or TAU request message.

5. The one or more NTCRSM of claim 4, wherein the Attach request message or the TAU request message is to include a Voice domain preference and UE's usage setting information element, and wherein the Voice domain preference and UE's usage setting information element is to indicate the UE's usage setting.

6. The one or more NTCRSM of claim 1, wherein, when the CE mode B Restricted parameter stored in the MM context is set to the "not restricted" value, execution of the instructions by the one or more processors is to cause the MME to extend NAS timer settings for the UE.

7. The one or more NTCRSM of claim 1, wherein controlling transmission of the CE mode B Restricted parameter to the base station via S1 signaling comprises sending an S1AP message to the base station, wherein the S1AP message is one of an Initial Context Setup Request message or a UE Radio Capability Match Request message during an Attach procedure or a Tracking Area Update (TAU) procedure.

8. The one or more NTCRSM of claim 7, wherein the CE mode B Restricted parameter associated with the UE is identified in response to receipt of an Attach Request message or a Tracking Area Update (TAU) Request message when the UE has initiated a Attach procedure or a TAU procedure in an EPS Mobility Management (EMM)-Idle mode, and wherein execution of the instructions by the one or more processors of the MME are to cause the MME to:

control deletion of any currently stored UE Radio Capability information of the UE; not send any UE Radio Capability information to the base station in the Initial Context Setup Request message or the UE Radio Capability Match Request message such that the base station is to be triggered to request UE Radio Capability information from the UE and to upload the requested UE Radio Capability to the MME in an S1 interface UE Capability Info Indication message;

receive an S1 interface UE Capability Info Indication message from the base station, wherein the S1 interface UE Capability Info Indication message is to include the UE Radio Capability information requested by the base station;

control storage of the UE Radio Capability information; and generate an Initial Context Setup Request message or a UE Radio Capability Match Request message to include the stored UE Radio Capability information in other cases than Attach procedure, Tracking Area Update procedure for the "first TAU following GERAN/UTRAN Attach" and "UE radio capability update" procedure.

9. The one or more NTCRSM of claim 1, wherein the CE mode B Restricted parameter associated with the UE is identified in response to receipt of a Tracking Area Update (TAU) Request message when the UE has initiated a TAU procedure in an EMM-Connected mode, and wherein execution of the instructions by the one or more processors of the MME are to cause the MME to:

receive the TAU Request message from the UE via NAS signaling, wherein the TAU Request message is to indicate that a UE radio capability information update is needed or that the UE's usage setting changed from the data centric usage setting to the voice centric usage setting or from the voice centric usage setting to the data centric usage setting;

transmit a UE Radio Capability Match Request message to the base station via S1 signaling, wherein the UE Radio Capability Match Request message is to include an update needed indicator, wherein the update needed indicator is to trigger the base station to send a UE Capability Enquiry message to the UE via radio resource control (RRC) signaling; and receive a UE Capability Info Indication message via the S1 signaling, wherein the UE Capability Info message is to include a UE Radio Capability information element (IE) and wherein the UE Radio Capability IE is to include a CE mode B support indication, and wherein the MME is to control storage of information of the UE Radio Capability IE in association with an identifier of the UE for subsequent network accesses by the UE.

10. A method performed by a Mobility Management Entity (MME), the method comprising:

receiving a Non-Access Stratum (NAS) message from a user equipment (UE) that is capable of operating in coverage enhancement (CE) mode B;

determining a usage setting of the UE that is indicated by the NAS message, the usage setting set to one of a voice centric usage setting or a data centric usage setting;

upon a determination that the usage setting of the UE is set to a voice centric usage setting, setting a CE mode B Restricted parameter in a mobility management (MM) context associated with the UE to have a "restricted" value;

upon a determination that the usage setting of the UE is set to a data centric usage setting, setting the CE mode B Restricted parameter in the MM context associated with the UE to have a "not restricted" value; and controlling transmission of the CE mode B Restricted parameter to a base station via S1 signaling to indicate whether the UE is restricted or not restricted for use of CE mode B.

11. The method of claim 10, wherein controlling transmission of the CE mode B Restricted parameter via the S1 signaling comprises:
generating an S1 application protocol (S1AP) message to include the CE mode B Restricted parameter.

12. The method of claim 11, wherein the S1AP message is one of an Initial Context Setup Request message, a Handover Request message, a Path Switch Request Acknowledge message, a Connection Establishment Indication message, or a Downlink Non-Access Stratum (NAS) Transport message carrying a Tracking Area Update (TAU) Accept message.

13. The method of claim 10, wherein the NAS message is an Attach request or TAU request message.

14. The method of claim 13, wherein the Attach request message or the TAU request message includes a Voice domain preference and UE's usage setting information element, and wherein the Voice domain preference and UE's usage setting information element indicates the UE's usage setting.

15. The method of claim 10, further comprising:
when the CE mode B Restricted parameter stored in the MM context is set to the "not restricted" value, extending NAS timer settings for the UE.

16. The method of claim 10, wherein controlling transmission of the CE mode B Restricted parameter to the base station via S1 signaling comprises sending an S1AP message to the base station,
and wherein the S1AP message is one of an Initial Context Setup Request message or a UE Radio Capability Match Request message during an Attach procedure or a Tracking Area Update (TAU) procedure.

17. The method of claim 16, wherein the CE mode B Restricted parameter associated with the UE is identified in response to receipt of an Attach Request message or a Tracking Area Update (TAU) Request message when the UE has initiated a Attach procedure or a TAU procedure in an EPS Mobility Management (EMM)-Idle mode, and wherein the method comprises:
controlling deletion of any currently stored UE Radio Capability information of the UE;
not sending any UE Radio Capability information to the base station in the Initial Context Setup Request message or the UE Radio Capability Match Request message such that the base station is to be triggered to request UE Radio Capability information from the UE and to upload the requested UE Radio Capability to the MME in an S1 interface UE Capability Info Indication message;
receiving an S1 interface UE Capability Info Indication message from the base station, wherein the S1 interface UE Capability Info Indication message is to include the UE Radio Capability information requested by the base station;
controlling storage of the UE Radio Capability information; and
generating an Initial Context Setup Request message or a UE Radio Capability Match Request message to include the stored UE Radio Capability information in other cases than Attach procedure, Tracking Area Update procedure for the "first TAU following GERAN/UTRAN Attach" and "UE radio capability update" procedure.

18. The method of claim 10, wherein the CE mode B Restricted parameter associated with the UE is identified in response to receipt of a Tracking Area Update (TAU) Request message when the UE has initiated a TAU procedure in an EMM-Connected mode, and wherein the method comprises:
receiving the TAU Request message from the UE via NAS signaling, wherein the TAU Request message is to indicate that a UE radio capability information update is needed or that the UE's usage setting changed from the data centric usage setting to the voice centric usage setting or from the voice centric usage setting to the data centric usage setting;
transmitting a UE Radio Capability Match Request message to the base station via S1 signaling, wherein the UE Radio Capability Match Request message is to include an update needed indicator, wherein the update needed indicator is to trigger the base station to send a UE Capability Enquiry message to the UE via radio resource control (RRC) signaling; and
receiving a UE Capability Info Indication message via the S1 signaling, wherein the UE Capability Info message is to include a UE Radio Capability information element (IE) and wherein the UE Radio Capability IE is to include a CE mode B support indication, and
wherein the MME is to control storage of information of the UE Radio Capability IE in association with an identifier of the UE for subsequent network accesses by the UE.

19. A method performed by a base station, the method comprising:
transmitting, to a Mobility Management Entity (MME), a Non-Access Stratum (NAS) message from a user equipment (UE) that is capable of operating in coverage enhancement (CE) mode B, the NAS message indicating a usage setting of the UE being set to one of a voice centric usage setting or a data centric usage setting;
in response to transmitting the NAS message, receiving, from the MME, an S1 application protocol (S1AP) message; and
determining, from the S1AP message, a value of a CE mode B Restricted parameter in a mobility management (MM) context associated with the UE,
wherein the CE mode B Restricted parameter in the MINI context associated with the UE is set to have a "restricted" value when the usage setting of the UE is set to a voice centric usage setting as indicated by the NAS message, and
the CE mode B Restricted parameter in the MM context associated with the UE is set to have a "not restricted" value when the usage setting of the UE is set to a data centric usage setting as indicated by the NAS message.

20. The method of claim 19, wherein the S1AP message is one of an Initial Context Setup Request message, a Handover Request message, a Path Switch Request Acknowledge message, a Connection Establishment Indication message, or a Downlink Non-Access Stratum (NAS) Transport message carrying a Tracking Area Update (TAU) Accept message, and
wherein the NAS message is an Attach request or TAU request message that includes a Voice domain preference and UE's usage setting information element, and wherein the Voice domain preference and UE's usage setting information element indicates the UE's usage setting.

* * * * *

UNITED STATES PATENT AND TRADEMARK OFFICE
CERTIFICATE OF CORRECTION

PATENT NO. : 11,197,230 B2  
APPLICATION NO. : 16/462339  
DATED : December 7, 2021  
INVENTOR(S) : Puneet Jain et al.

Page 1 of 1

It is certified that error appears in the above-identified patent and that said Letters Patent is hereby corrected as shown below:

On the Title Page

Column 1, beneath Item [72], Delete "Roquefors-les-Pins (FR)" and insert -- Roquefort-les-Pins (FR) --;

Column 2 (Other Publications), Line 1, Delete "internation" and insert -- international --;

In the Specification

Column 1, Line 12, Delete "2017" and insert -- 2017, --; and

In the Claims

Column 58, Line 45, In Claim 19, delete "MINI" and insert -- MM --.

Signed and Sealed this  
Fifth Day of April, 2022

Drew Hirshfeld  
*Performing the Functions and Duties of the  
Under Secretary of Commerce for Intellectual Property and  
Director of the United States Patent and Trademark Office*